(12) United States Patent
Martin et al.

(10) Patent No.: US 6,438,430 B1
(45) Date of Patent: Aug. 20, 2002

(54) KILN THERMAL AND COMBUSTION CONTROL

(75) Inventors: Gregory D. Martin, Georgetown; Eugene Boe, Austin; Stephen Piche, Austin; James David Keeler, Austin; Douglas Timmer, Austin; Mark Gerules, Cedar Park; John P. Havener, Liberty Hill, all of TX (US)

(73) Assignee: Pavilion Technologies, Inc., Austin, TX (US)

( * ) Notice: Subject to any disclaimer, the term of this patent is extended or adjusted under 35 U.S.C. 154(b) by 0 days.

(21) Appl. No.: 09/568,190

(22) Filed: May 9, 2000

Related U.S. Application Data

(63) Continuation-in-part of application No. 09/514,733, filed on Feb. 28, 2000, which is a continuation-in-part of application No. 09/250,432, filed on Feb. 16, 1999, which is a continuation of application No. 08/643,464, filed on May 6, 1996, now Pat. No. 5,933,345.

(51) Int. Cl.$^7$ ............................................. G05B 13/02
(52) U.S. Cl. .......................................... 700/28; 700/52
(58) Field of Search ............................. 700/23, 29, 30, 700/34, 40–44, 52; 219/497; 703/12

(56) References Cited

U.S. PATENT DOCUMENTS

| | | | | |
|---|---|---|---|---|
| 5,408,405 A | * | 4/1995 | Mozumder et al. | 700/44 |
| 5,442,544 A | * | 8/1995 | Jelinek | 700/44 |
| 5,710,033 A | * | 1/1998 | Hallewell et al. | 435/189 |
| 6,056,781 A | * | 5/2000 | Wassick et al. | 703/12 |
| 6,207,936 B1 | * | 3/2001 | de Waard et al. | 219/497 |

* cited by examiner

*Primary Examiner*—Leo Picard
*Assistant Examiner*—Kidest Bahta
(74) *Attorney, Agent, or Firm*—Howison, Thoma & Arnott, L.L.P.

(57) ABSTRACT

A kiln thermal and combustion control. A predictive model is provided of the dynamics of selected aspects of the operation of the plant for modeling the dynamics thereof. The model has at least two discrete models associated therewith that model at least two of the selected aspects, the at least two discrete models having different dynamic responses. An optimizer receives desired values for the selected aspects of the operation of the plant modeled by the model and optimizes the inputs to the model to minimize error between the predicted and desired values. A control input device then applies the optimized input values to the plant after optimization thereof.

24 Claims, 19 Drawing Sheets

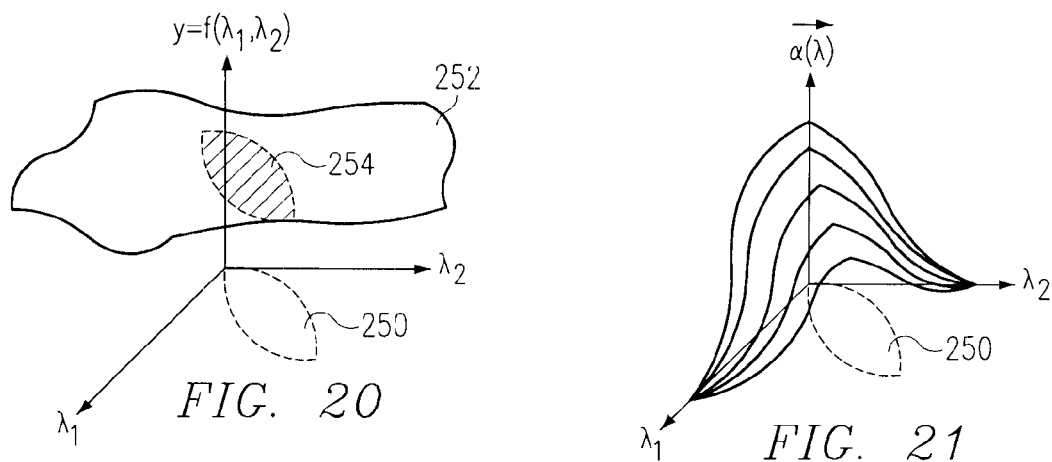
FIG. 20
FIG. 21
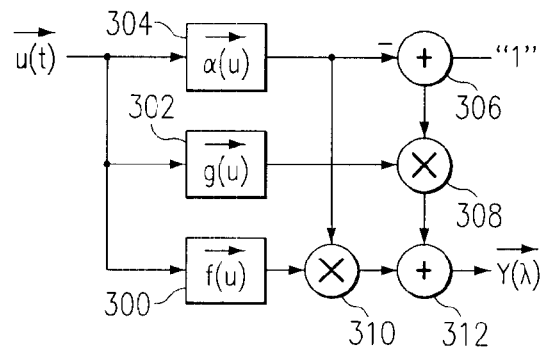
FIG. 22
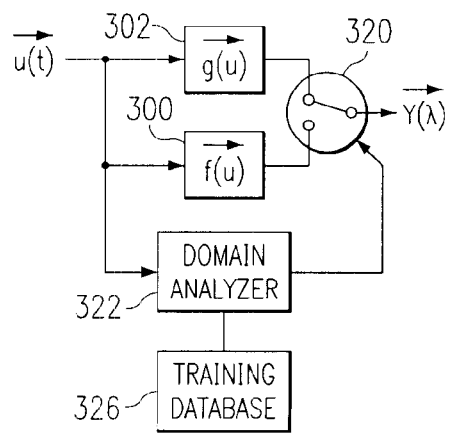
FIG. 23

|  | BLAINE | RETURN | EAR | MOTOR |
|---|---|---|---|---|
| FFeed | DYNAMIC USER-SPECIFIED | DYNAMIC USER-SPECIFIED | DYNAMIC USER-SPECIFIED | DYNAMIC USER-SPECIFIED |
|  | MIN GAIN: -150.000 | MIN GAIN: 0.200 | MIN GAIN: 1.600 | MIN GAIN: -180.000 |
|  | MAX GAIN: -10.000 | MAX GAIN: 1.200 | MAX GAIN: 1.600 | MAX GAIN: -180.000 |
|  | ORDER: SECOND | ORDER: SECOND | ORDER: SECOND | ORDER: SECOND |
|  | OVER AND CRITICALLY | OVER AND CRITICALLY | OVER AND CRITICALLY | OVER AND CRITICALLY |
|  | DAMPED DELAY: 4.000m | DAMPED DELAY: 6.000m | DAMPED DELAY: 8.000m | DAMPED DELAY: 1.000m |
|  | TIME CONSTANT 1: 2.000m | TIME CONSTANT 1: 2.000m | TIME CONSTANT 1: 2.000m | TIME CONSTANT 1: 2.000m |
|  | TIME CONSTANT 2: 3.000m | TIME CONSTANT 2: 3.000m | TIME CONSTANT 2: 2.500m | TIME CONSTANT 2: 2.500m |
|  | LEAD TIME: 0.000m | LEAD TIME: 0.000m | LEAD TIME: 0.000m | LEAD TIME: 0.000m |
| SepSpd | DYNAMIC USER-SPECIFIED | DYNAMIC USER-SPECIFIED | DYNAMIC USER-SPECIFIED | DYNAMIC USER-SPECIFIED |
|  | MIN GAIN: 145.000 | MIN GAIN: 0.100 | MIN GAIN: 3.750 | MIN GAIN: -40.000 |
|  | MAX GAIN: 145.000 | MAX GAIN: 2.000 | MAX GAIN: 3.750 | MAX GAIN: -40.000 |
|  | ORDER: SECOND | ORDER: SECOND | ORDER: SECOND | ORDER: SECOND |
|  | OVER AND CRITICALLY | OVER AND CRITICALLY | OVER AND CRITICALLY | OVER AND CRITICALLY |
|  | DAMPED DELAY: 0.000m | DAMPED DELAY: 8.000m | DAMPED DELAY: 3.000m | DAMPED DELAY: 18.000m |
|  | TIME CONSTANT 1: 1.000m | TIME CONSTANT 1: 2.000m | TIME CONSTANT 1: 2.000m | TIME CONSTANT 1: 2.000m |
|  | TIME CONSTANT 2: 2.000m | TIME CONSTANT 2: 5.000m | TIME CONSTANT 2: 6.000m | TIME CONSTANT 2: 3.000m |
|  | LEAD TIME: 0.000m | LEAD TIME: 0.000m | LEAD TIME: 0.000m | LEAD TIME: 0.000m |

*FIG. 26*

KILN THERMAL AND COMBUSTION CONTROL

CROSS-REFERENCE TO RELATED APPLICATIONS

This application is a Continuation-in-Part of pending U.S. patent application Ser. No. 09/514,733, filed Feb. 28, 2000 entitled "METHOD AND APPARATUS FOR CONTROLLING A NON-LINEAR MILL," which is a Continuation-in-Part of pending U.S. patent application Ser. No. 09/250,432, filed Feb. 16, 1999 entitled "METHOD AND APPARATUS FOR MODELING DYNAMIC AND STEADY STATE PROCESSES FOR PREDICTION, CONTROL AND OPTIMIZATION," which is a Continuation of issued U.S. patent application Ser. No. 08/643,464, filed May 6, 1996, now U.S. Pat. No. 5,933,345 issued Aug. 3, 1999, entitled "METHOD AND APPARATUS FOR DYNAMIC AND STEADY STATE MODELING OVER A DESIRED PATH BETWEEN TWO END POINTS."

TECHNICAL FIELD OF THE INVENTION

This invention pertains in general to modeling techniques and, more particularly, to combining steady-state and dynamic models for the purpose of prediction, control and optimization for control of a kiln.

BACKGROUND OF THE INVENTION

Process models that are utilized for prediction, control and optimization can be divided into two general categories, steady-state models and dynamic models. In each case the model is a mathematical construct that characterizes the process, and process measurements are utilized to parameterize or fit the model so that it replicates the behavior of the process. The mathematical model can then be implemented in a simulator for prediction or inverted by an optimization algorithm for control or optimization.

Steady-state or static models are utilized in modern process control systems that usually store a great deal of data, this data typically containing steady-state information at many different operating conditions. The steady-state information is utilized to train a non-linear model wherein the process input variables are represented by the vector U that is processed through the model to output the dependent variable Y. The non-linear model is a steady-state phenomenological or empirical model developed utilizing several ordered pairs $(U_i, Y_i)$ of data from different measured steady states. If a model is represented as:

$$Y = P(U,Y) \qquad (1)$$

where P is some parameterization, then the steady-state modeling procedure can be presented as:

$$(\vec{U}, \vec{Y}) \rightarrow P \qquad (2)$$

where U and Y are vectors containing the $U_i, Y_i$ ordered pair elements. Given the model P, then the steady-state process gain can be calculated as:

$$K = \frac{\Delta P(U, Y)}{\Delta U} \qquad (3)$$

The steady-state model therefore represents the process measurements that are taken when the system is in a "static" mode. These measurements do not account for the perturbations that exist when changing from one steady-state condition to another steady-state condition. This is referred to as the dynamic part of a model.

A dynamic model is typically a linear model and is obtained from process measurements which are not steady-state measurements; rather, these are the data obtained when the process is moved from one steady-state condition to another steady-state condition. This procedure is where a process input or manipulated variable u(t) is input to a process with a process output or controlled variable y(t) being output and measured. Again, ordered pairs of measured data (u(I), y(I)) can be utilized to parameterize a phenomenological or empirical model, this time the data coming from non-steady-state operation. The dynamic model is represented as:

$$y(t) = p(u(t), y(t)) \qquad (4)$$

where p is some parameterization. Then the dynamic modeling procedure can be represented as:

$$(\vec{u}, \vec{y}) \rightarrow p \qquad (5)$$

Where u and y are vectors containing the (u(I),y(I)) ordered pair elements. Given the model p, then the steady-state gain of a dynamic model can be calculated as:

$$k = \frac{\Delta p(u, y)}{\Delta u} \qquad (6)$$

Unfortunately, almost always the dynamic gain k does not equal the steady-state gain K, since the steady-state gain is modeled on a much larger set of data, whereas the dynamic gain is defined around a set of operating conditions wherein an existing set of operating conditions are mildly perturbed. This results in a shortage of sufficient non-linear information in the dynamic data set in which non-linear information is contained within the static model. Therefore, the gain of the system may not be adequately modeled for an existing set of steady-state operating conditions. Thus, when considering two independent models, one for the steady-state model and one for the dynamic model, there is a mis-match between the gains of the two models when used for prediction, control and optimization. The reason for this mis-match are that the steady-state model is non-linear and the dynamic model is linear, such that the gain of the steady-state model changes depending on the process operating point, with the gain of the linear model being fixed. Also, the data utilized to parameterize the dynamic model do not represent the complete operating range of the process, i.e., the dynamic data is only valid in a narrow region. Further, the dynamic model represents the acceleration properties of the process (like inertia) whereas the steady-state model represents the tradeoffs that determine the process final resting value (similar to the tradeoff between gravity and drag that determines terminal velocity in free fall).

One technique for combining non-linear static models and linear dynamic models is referred to as the Hammerstein model. The Hammerstein model is basically an input-output representation that is decomposed into two coupled parts. This utilizes a set of intermediate variables that are determined by the static models which are then utilized to construct the dynamic model. These two models are not independent and are relatively complex to create.

SUMMARY OF THE INVENTION

The present invention disclosed and claimed herein comprises, in one aspect thereof, a controller for controlling a multi-variable input plant having a plurality of manipulatible variables (MVs) as inputs, and operable to provide an output. A predictive model is provided of the dynamics of selected aspects of the operation of the plant for modeling the dynamics thereof. The model has at least two discrete models associated therewith that model at least two of the selected aspects, the at least two discrete models having different dynamic responses. An optimizer receives desired values for the selected aspects of the operation of the plant modeled by the model and optimizes the inputs to the model to minimize error between the predicted and desired values. A control input device then applies the optimized input values to the plant after optimization thereof.

BRIEF DESCRIPTION OF THE DRAWINGS

For a more complete understanding of the present invention and the advantages thereof, reference is now made to the following description taken in conjunction with the accompanying Drawings in which:

FIG. 20 illustrates a diagrammatic view of the input space and the error associated therewith;

FIG. 21 illustrates diagrammatic view of the confidence factor in the input space;

FIG. 22 illustrates a block diagram of the method for utilizing a combination of a non-linear system and a first principal system; and FIG. 23 illustrates an alternate embodiment of the embodiment of FIG. 22.

FIG. 26 illustrates a table for various aspects of the mill associated with the fresh feed and the separator speed;

DETAILED DESCRIPTION OF THE INVENTION

Figure 1:
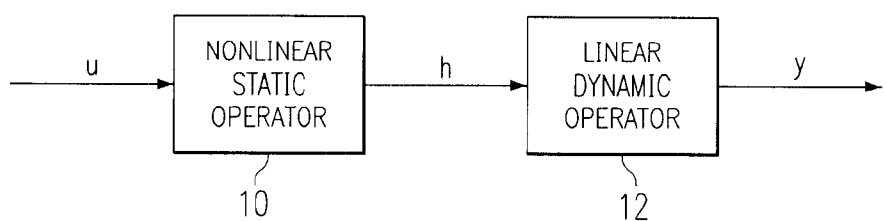
FIG. 1 illustrates a prior art Hammerstein model.

Referring now to FIG. 1, there is illustrated a diagrammatic view of a Hammerstein model of the prior art. This is comprised of a non-linear static operator model 10 and a linear dynamic model 12, both disposed in a series configuration. The operation of this model is described in H. T. Su, and T. J. McAvoy, "Integration of Multilayer Perceptron Networks and Linear Dynamic Models: A Hammerstein Modeling Approach" to appear in *I& EC Fundamentals*, paper dated Jul. 7, 1992, which reference is incorporated herein by reference. Hammerstein models in general have been utilized in modeling non-linear systems for some time. The structure of the Hammerstein model illustrated in FIG. 1 utilizes the non-linear static operator model 10 to transform the input U into intermediate variables H. The non-linear operator is usually represented by a finite polynomial expansion. However, this could utilize a neural network or any type of compatible modeling system. The linear dynamic operator model 12 could utilize a discreet dynamic transfer function representing the dynamic relationship between the intermediate variable H and the output Y. For multiple input systems, the non-linear operator could utilize a multilayer neural network, whereas the linear operator could utilize a two layer neural network. A neural network for the static operator is generally well known and described in U.S. Pat. No. 5,353,207, issued Oct. 4, 1994, and assigned to the present assignee, which is incorporated herein by reference. These type of networks are typically referred to as a multilayer feed-forward network which utilizes training in the form of back-propagation. This is typically performed on a large set of training data. Once trained, the network has weights associated therewith, which are stored in a separate database.

Once the steady-state model is obtained, one can then choose the output vector from the hidden layer in the neural network as the intermediate variable for the Hammerstein model. In order to determine the input for the linear dynamic operator, u(t), it is necessary to scale the output vector h(d) from the non-linear static operator model 10 for the mapping of the intermediate variable h(t) to the output variable of the dynamic model y(t), which is determined by the linear dynamic model.

During the development of a linear dynamic model to represent the linear dynamic operator, in the Hammerstein model, it is important that the steady-state non-linearity remain the same. To achieve this goal, one must train the dynamic model subject to a constraint so that the non-linearity learned by the steady-state model remains unchanged after the training. This results in a dependency of the two models on each other.

Figure 2:
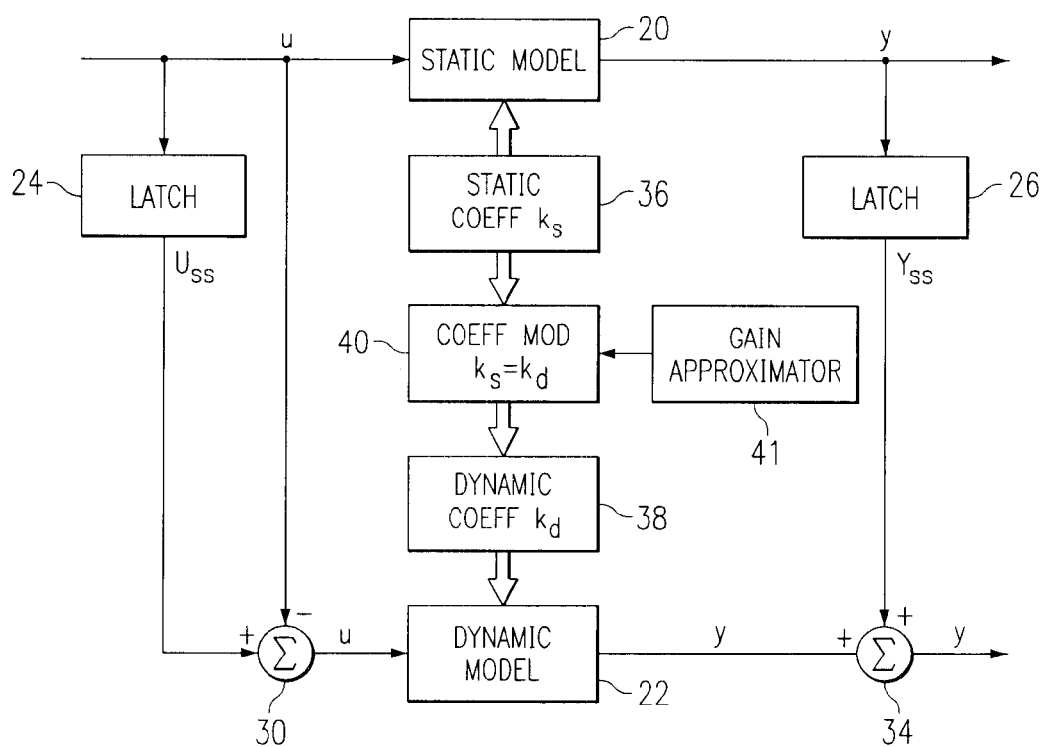
FIG. 2 illustrates a block diagram of the modeling technique of the present invention.

Referring now to FIG. 2, there is illustrated a block diagram of the modeling method of the present invention, which is referred to as a systematic modeling technique. The general concept of the systematic modeling technique in the present invention results from the observation that, while process gains (steady-state behavior) vary with U's and Y's,( i.e., the gains are non-linear), the process dynamics seemingly vary with time only, (i.e., they can be modeled as locally linear, but time-varied). By utilizing non-linear models for the steady-state behavior and linear models for the dynamic behavior, several practical advantages result. They are as follows:

1. Completely rigorous models can be utilized for the steady-state part. This provides a credible basis for economic optimization.
2. The linear models for the dynamic part can be updated on-line, i.e., the dynamic parameters that are known to be time-varying can be adapted slowly.
3. The gains of the dynamic models and the gains of the steady-state models can be forced to be consistent (k=K).

With further reference to FIG. 2, there are provided a static or steady-state model 20 and a dynamic model 22. The static model 20, as described above, is a rigorous model that is trained on a large set of steady-state data. The static model 20 will receive a process input U and provide a predicted output Y. These are essentially steady-state values. The steady-state values at a given time are latched in various latches, an input latch 24 and an output latch 26. The latch 24 contains the steady-state value of the input $U_{ss}$, and the latch 26 contains the steady-state output value $Y_{ss}$. The dynamic model 22 is utilized to predict the behavior of the plant when a change is made from a steady-state value of $Y_{ss}$, to a new value Y. The dynamic model 22 receives on the input the dynamic input value u and outputs a predicted dynamic value y. The value u is comprised of the difference between the new value U and the steady-state value in the latch 24, $U_{ss}$. This is derived from a subtraction circuit 30 which receives on the positive input thereof the output of the latch 24 and on the negative input thereof the new value of U. This therefore. represents the delta change from the steady-state. Similarly, on the output the predicted overall dynamic value will be the sum of the output value of the dynamic model, y, and the steady-state output value stored in the latch 26, $Y_{ss}$. These two values are summed with a summing block 34 to provide a predicted output Y. The difference between the value output by the summing junction 34 and the predicted value output by the static model 20 is that the predicted value output by the summing junction 20 accounts for the dynamic operation of the system during a change. For example, to process the input values that are in the input vector U by the static model 20, the rigorous model, can take significantly more time than running a relatively simple dynamic model. The method utilized in the present invention is to force the gain of the dynamic model 22 $k_d$ to equal the gain $K_{ss}$ of the static model 20.

In the static model 20, there is provided a storage block 36 which contains the static coefficients associated with the static model 20 and also the associated gain value $K_{ss}$. Similarly, the dynamic model 22 has a storage area 38 that is operable to contain the dynamic coefficients and the gain value $k_d$. One of the important aspects of the present invention is a link block 40 that is operable to modify the coefficients in the storage area 38 to force the value of $k_d$ to be equal to the value of $K_{ss}$. Additionally, there is an approximation block 41 that allows approximation of the dynamic gain $k_d$ between the modification updates.

Systematic Model

The linear dynamic model 22 can generally be represented by the following equations:

$$\delta y(t) = \sum_{i=1}^{n} b_i \delta u(t - d - i) - \sum_{i=1}^{n} a_i \delta y(t - i) \qquad (7)$$

where:

$$\delta y(t) = y(t) - Y_{ss} \qquad (8)$$

$$\delta u(t) = u(t) - u_{ss} \qquad (9)$$

and t is time, $a_i$ and $b_i$ are real numbers, d is a time delay, u(t) is an input and y(t) an output. The gain is represented by:

$$\frac{y(B)}{u(B)} = k = \frac{\left(\sum_{i=1}^{n} b_i B^{i-1}\right) B^d}{1 + \sum_{i=1}^{n} a_i B^{i-1}} \qquad (10)$$

where B is the backward shift operator B(x(t))=x(t−1), t=time, the $a_i$, and $b_i$ are real numbers, I is the number of discreet time intervals in the dead-time of the process, and n is the order of the model. This is a general representation of a linear dynamic model, as contained in George E. P. Box and G. M. Jenkins, "TIME SERIES ANALYSIS forecasting and control", Holden-Day, San Francisco, 1976, Section 10.2, Page 345. This reference is incorporated herein by reference.

The gain of this model can be calculated by setting the value of B equal to a value of "1". The gain will then be defined by the following equation:

$$\left(\left[\frac{y(B)}{u(B)}\right]\right)_{B=1} = k_d = \frac{\sum_{i=1}^{n} b_i}{1 + \sum_{i=1}^{n} a_i} \qquad (11)$$

The $a_i$ contain the dynamic signature of the process, its unforced, natural response characteristic. They are independent of the process gain. The $b_i$ contain part of the dynamic signature of the process; however, they alone contain the result of the forced response. The $b_i$ determine the gain k of the dynamic model. See: J. L. Shearer, A. T. Murphy, and H. H. Richardson, "Introduction to System Dynamics", Addison-Wesley, Reading, Mass., 1967, Chapter 12. This reference is incorporated herein by reference.

Since the gain $K_{ss}$ of the steady-state model is known, the gain $k_d$ of the dynamic model can be forced to match the gain of the steady-state model by scaling the $b_i$ parameters. The values of the static and dynamic gains are set equal with the value of $b_i$ scaled by the ratio of the two gains:

$$(b_i)_{scaled} = (b_i)_{old}\left(\frac{K_{ss}}{k_d}\right) \quad (12)$$

$$(b_i)_{scaled} = \frac{(b_i)_{old} K_{ss}\left(1 + \sum_{i=1}^{n} a_i\right)}{\sum_{i=1}^{n} b_i} \quad (13)$$

This makes the dynamic model consistent with its steady-state counterpart. Therefore, each time the steady-state value changes, this corresponds to a gain $K_{ss}$ of the steady-state model. This value can then be utilized to update the gain $k_d$ of the dynamic model and, therefore, compensate for the errors associated with the dynamic model wherein the value of $k_d$ is determined based on perturbations in the plant on a given set of operating conditions. Since all operating conditions are not modeled, the step of varying the gain will account for changes in the steady-state starting points.

Figure 3A:
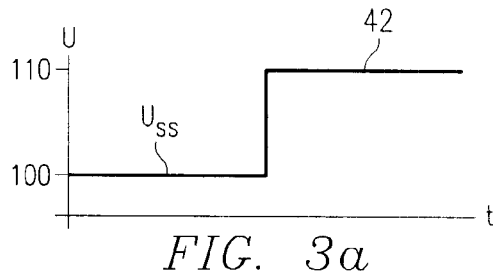
FIGS. 3a–3d illustrate timing diagrams for the various outputs of the system of FIG. 2.
Figure 3B:
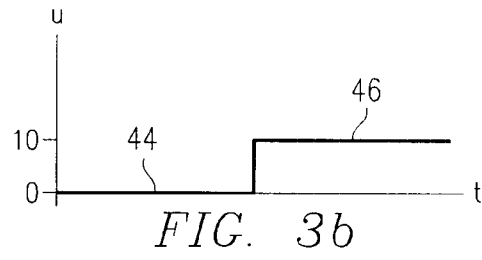

Referring now to FIGS. 3a–3d, there are illustrated plots of the system operating in response to a step function wherein the input value U changes from a value of 100 to a value of 110. In FIG. 3a, the value of 100 is referred to as the previous steady-state value $U_{ss}$. In FIG. 3b, the value of u varies from a value of 0 to a value of 10, this representing the delta between the steady-state value of $U_{ss}$ to the level of 110, represented by reference numeral 42 in FIG. 3a. Therefore, in FIG. 3b the value of u will go from 0 at a level 44, to a value of 10 at a level 46.

Figure 3C:
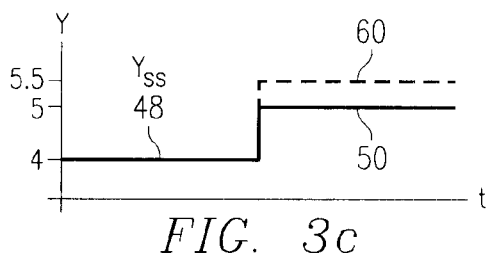
Figure 3D:
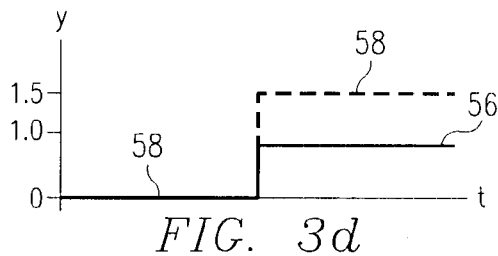

In FIG. 3c, the output Y is represented as having a steady-state value $Y_{ss}$ of 4 at a level 48. When the input value U rises to the level 42 with a value of 110, the output value will rise. This is a predicted value. The predicted value which is the proper output value is represented by a level 50, which level 50 is at a value of 5. Since the steady-state value is at a value of 4, this means that the dynamic system must predict a difference of a value of 1. This is represented by FIG. 3d wherein the dynamic output value y varies from a level 54 having a value of 0 to a level 56 having a value of 1.0. However, without the gain scaling, the dynamic model could, by way of example, predict a value for y of 1.5, represented by dashed level 58, if the steady-state values were outside of the range in which the dynamic model was trained. This would correspond to a value of 5.5 at a level 60 in the plot of FIG. 3c. It can be seen that the dynamic model merely predicts the behavior of the plant from a starting point to a stopping point, not taking into consideration the steady-state values. It assumes that the steady-state values are those that it was trained upon. If the gain $k_d$ were not scaled, then the dynamic model would assume that the steady-state values at the starting point were the same that it was trained upon. However, the gain scaling link between the steady-state model and the dynamic model allow the gain to be scaled and the parameter $b_i$ to be scaled such that the dynamic operation is scaled and a more accurate prediction is made which accounts for the dynamic properties of the system.

Figure 4:
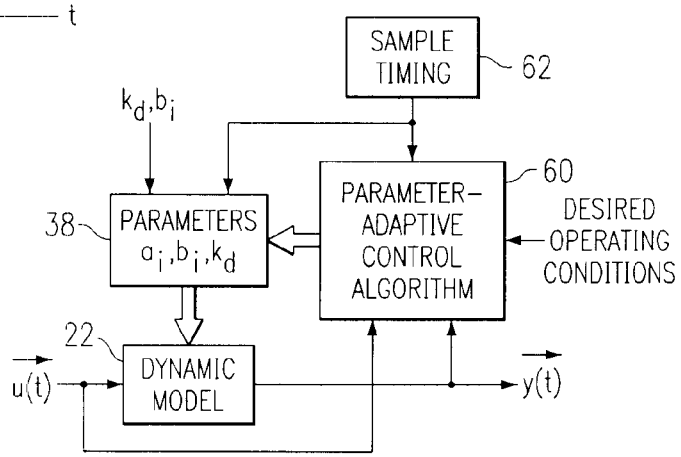
FIG. 4 illustrates detailed block diagram of the dynamic model utilizing the identification method.

Referring now to FIG. 4, there is illustrated a block diagram of a method for determining the parameters $a_i$, $b_i$. This is usually achieved through the use of an identification algorithm, which is conventional. This utilizes the (u(t),y(t)) pairs to obtain the $a_i$ and $b_i$ parameters. In the preferred embodiment, a recursive identification method is utilized where the $a_i$ and $b_i$ parameters are updated with each new $(u_i(t), y_i(t))$ pair. See: T. Eykhoff, "System Identification", John Wiley & Sons, New York, 1974, Pages 38 and 39, et. seq., and H. Kurz and W. Godecke, "Digital Parameter-Adaptive Control Processes with Unknown Dead Time", Automatica, Vol. 17, No. 1, 1981, pp. 245–252, which references are incorporated herein by reference.

In the technique of FIG. 4, the dynamic model 22 has the output thereof input to a parameter-adaptive control algorithm block 60 which adjusts the parameters in the coefficient storage block 38, which also receives the scaled values of k, $b_i$. This is a system that is updated on a periodic basis, as defined by timing block 62. The control algorithm 60 utilizes both the input u and the output y for the purpose of determining and updating the parameters in the storage area 38.

Figure 5:
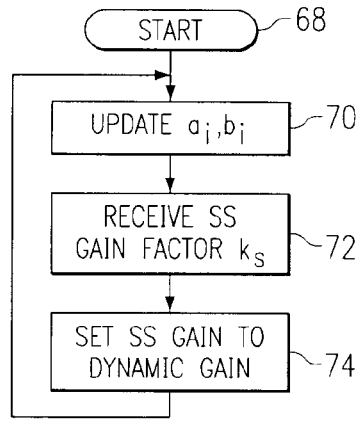
FIG. 5 illustrates block diagram of the operation of the model of FIG. 4.

Referring now to FIG. 5, there is illustrated a block diagram of the preferred method. The program is initiated in a block 68 and then proceeds to a function block 70 to update the parameters $a_i$, $b_i$ utilizing the (u(I),y(I)) pairs. Once these are updated, the program flows to a function block 72 wherein the steady-state gain factor K is received, and then to a function block 74 to set the dynamic gain to the steady state gain, i.e., provide the scaling function described hereinabove. This is performed after the update. This procedure can be used for on-line identification, non-linear dynamic model prediction and adaptive control.

Figure 6:
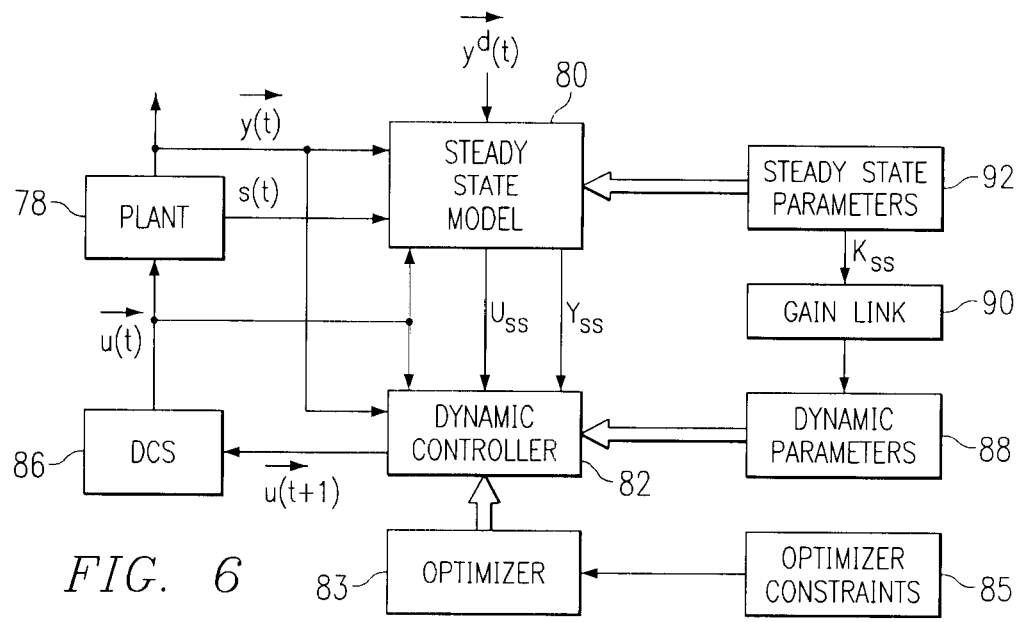
FIG. 6 an example of the modeling technique of the present invention utilized in a control environment.

Referring now to FIG. 6, there is illustrated a block diagram of one application of the present invention utilizing a control environment. A plant 78 is provided which receives input values u(t) and outputs an output vector y(t). The plant 78 also has measurable state variables s(t). A predictive model 80 is provided which receives the input values u(t) and the state variables s(t) in addition to the output value y(t). The steady-state model 80 is operable to output a predicted value of both y(t) and also of a future input value u(t+1). This constitutes a steady-state portion of the system. The predicted steady-state input value is $U_{ss}$ with the predicted steady-state output value being $Y_{ss}$. In a conventional control scenario, the steady-state model 80 would receive as an external input a desired value of the output $y^d(t)$ which is the desired value that the overall control system seeks to achieve. This is achieved by controlling a distributed control system (DCS) 86 to produce a desired input to the plant. This is referred to as u(t+1), a future value. Without considering the dynamic response, the predictive model 80, a steady-state model, will provide the steady-state values. However, when a change is desired, this change will effectively be viewed as a "step response".

To facilitate the dynamic control aspect, a dynamic controller 82 is provided which is operable to receive the input u(t), the output value y(t) and also the steady-state values $U_{ss}$ and $Y_{ss}$ and generate the output u(t+1). The dynamic controller effectively generates the dynamic response between the changes, i.e., when the steady-state value changes from an initial steady-state value $U_{ss}^i$, $Y_{ss}^i$ to a final steady-state value $U_{ss}^f$, $Y_{ss}^f$.

During the operation of the system, the dynamic controller 82 is operable in accordance with the embodiment of FIG. 2 to update the dynamic parameters of the dynamic controller 82 in a block 88 with a gain link block 90, which utilizes the value $K_{ss}$ from a steady-state parameter block in order to scale the parameters utilized by the dynamic controller 82, again in accordance with the above described method. In this manner, the control function can be realized. In addition, the dynamic controller 82 has the operation thereof optimized such that the path traveled between the initial and final steady-state values is achieved with the use of the optimizer 83 in view of optimizer constraints in a block 85. In general, the predicted model (steady-state model) 80 provides a control network function that is operable to predict the future input values. Without the dynamic controller 82, this is a conventional control network which is generally described in U.S. Pat. No. 5,353,207, issued Oct. 4, 1994, to the present assignee, which patent is incorporated herein by reference.

Approximate Systematic Modeling

For the modeling techniques described thus far, consistency between the steady-state and dynamic models is maintained by rescaling the $b_i$ parameters at each time step utilizing equation 13. If the systematic model is to be utilized in a Model Predictive Control (MPC) algorithm, maintaining consistency may be computationally expensive. These types of algorithms are described in C. E. Garcia, D. M. Prett and M. Morari. Model predictive control: theory and practice—a survey, Automatica, 25:335–348, 1989; D. E. Seborg, T. F. Edgar, and D. A. Mellichamp. Process Dynamics and Control. John Wiley and Sons, New York, N.Y., 1989. These references are incorporated herein by reference. For example, if the dynamic gain $k_d$ is computed from a neural network steady-state model, it would be necessary to execute the neural network module each time the model was iterated in the MPC algorithm. Due to the potentially large number of model iterations for certain MPC problems, it could be computationally expensive to maintain a consistent model. In this case, it would be better to use an approximate model which does not rely on enforcing consistencies at each iteration of the model.

Figure 7:
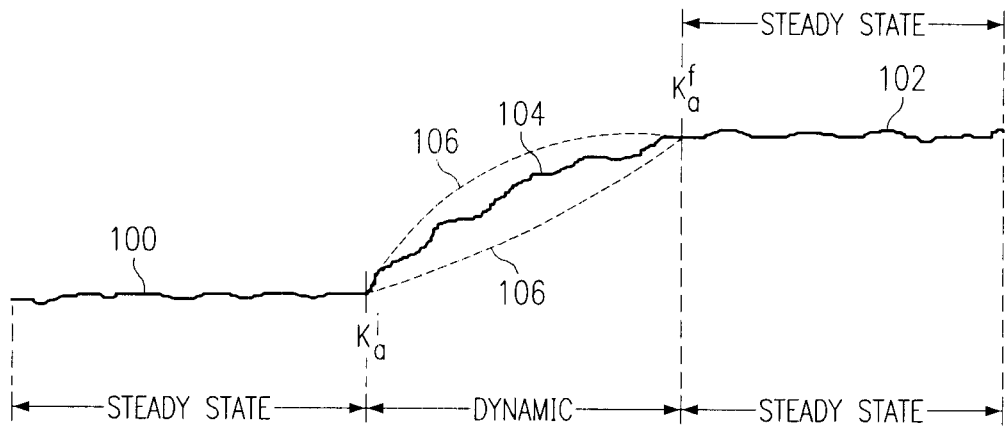
FIG. 7 illustrates diagrammatic view of a change between two steady-state values.

Referring now to FIG. 7, there is illustrated a diagram for a change between steady state values. As illustrated, the steady-state model will make a change from a steady-state value at a line 100 to a steady-state value at a line 102. A transition between the two steady-state values can result in unknown settings. The only way to insure that the settings for the dynamic model between the two steady-state values, an initial steady-state value $K_{ss}^i$ and a final steady-state gain $K_{ss}^f$, would be to utilize a step operation, wherein the dynamic gain $k_d$ was adjusted at multiple positions during the change. However, this may be computationally expensive. As will be described hereinbelow, an approximation algorithm is utilized for approximating the dynamic behavior between the two steady-state values utilizing a quadratic relationship. This is defined as a behavior line 104, which is disposed between an envelope 106, which behavior line 104 will be described hereinbelow.

Figure 8:
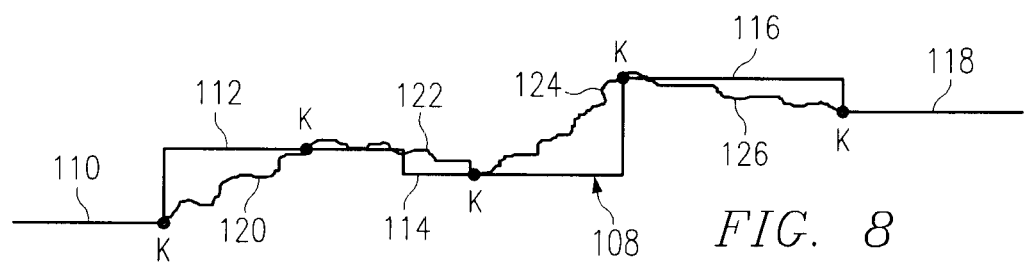
FIG. 8 illustrates a diagrammatic view of the approximation algorithm for changes in the steady-state value.

Referring now to FIG. 8, there is illustrated a diagrammatic view of the system undergoing numerous changes in steady-state value as represented by a stepped line 108. The stepped line 108 is seen to vary from a first steady-state value at a level 110 to a value at a level 112 and then down to a value at a level 114, up to a value at a level 116 and then down to a final value at a level 118. Each of these transitions can result in unknown states. With the approximation algorithm that will be described hereinbelow, it can be seen that, when a transition is made from level 110 to level 112, an approximation curve for the dynamic behavior 120 is provided. When making a transition from level 114 to level 116, an approximation gain curve 124 is provided to approximate the steady state gains between the two levels 114 and 116. For making the transition from level 116 to level 118, an approximation gain curve 126 for the steady-state gain is provided. It can therefore be seen that the approximation curves 120–126 account for transitions between steady-state values that are determined by the network, it being noted that these are approximations which primarily maintain the steady-state gain within some type of error envelope, the envelope 106 in FIG. 7.

The approximation is provided by the block 41 noted in FIG. 2 and can be designed upon a number of criteria, depending upon the problem that it will be utilized to solve. The system in the preferred embodiment, which is only one example, is designed to satisfy the following criteria:

1. Computational Complexity: The approximate systematic model will be used in a Model Predictive Control algorithm, therefore, it is required to have low computational complexity.

2. Localized Accuracy: The steady-state model is accurate in localized regions. These regions represent the steady-state operating regimes of the process. The steady-state model is significantly less accurate outside these localized regions.

3. Final Steady-State: Given a steady-state set point change, an optimization algorithm which uses the steady-state model will be used to compute the steady-state inputs required to achieve the set point. Because of item 2, it is assumed that the initial and final steady-states associated with a set-point change are located in regions accurately modeled by the steady-state model.

Given the noted criteria, an approximate systematic model can be constructed by enforcing consistency of the steady-state and dynamic model at the initial and final steady-state associated with a set point change and utilizing a linear approximation at points in between the two steady-states. This approximation guarantees that the model is accurate in regions where the steady-state model is well known and utilizes a linear approximation in regions where the steady-state model is known to be less accurate. In addition, the resulting model has low computational complexity. For purposes of this proof, Equation 13 is modified as follows:

$$b_{i,scaled} = \frac{b_i K_{ss}(u(t-d-1))\left(1 + \sum_{i=1}^{n} a_i\right)}{\sum_{i=1}^{n} b_i} \tag{14}$$

This new equation 14 utilizes $K_{ss}(u(t-d-1))$ instead of $K_{ss}(u(t))$ as the consistent gain, resulting in a systematic model which is delay invariant.

The approximate systematic model is based upon utilizing the gains associated with the initial and final steady-state values of a set-point change. The initial steady-state gain is denoted $K_{ss}^i$ while the initial steady-state input is given by $U_{ss}^i$. The final steady-state gain is $K_{ss}^f$ and the final input is $U_{ss}^f$. Given these values, a linear approximation to the gain is given by:

$$K_{ss}(u(t)) = K_{ss}^i + \frac{K_{ss}^f - K_{ss}^i}{U_{ss}^f - U_{ss}^i}(u(t) - U_{ss}^i). \tag{15}$$

Substituting this approximation into Equation 13 and replacing $u(t-d-1)-u^i$ by $\delta u(t-d-1)$ yields:

$$\tilde{b}_{j,scaled} = \tag{16}$$

$$\frac{b_j K_{ss}^i \left(1 + \sum_{i=1}^{n} a_i\right)}{\sum_{i=1}^{n} b_i} + \frac{1}{2} \frac{b_j \left(1 + \sum_{i=1}^{n} a_i\right)(K_{ss}^f - K_{ss}^i)}{\left(\sum_{i=1}^{n} b_i\right)(U_{ss}^f - U_{ss}^i)} \delta u(t-d-i).$$

To simplify the expression, define the variable $\bar{b}_j$-Bar as:

$$\bar{b}_j = \frac{b_j K_{ss}^i \left(1 + \sum_{i=1}^{n} a_i\right)}{\sum_{i=1}^{n} b_i} \quad (17)$$

and $g_j$ as:

$$g_j = \frac{b_j \left(1 + \sum_{i=1}^{n} a_i\right)(K_{ss}^f - K_{ss}^i)}{\left(\sum_{i=1}^{n} b_i\right)(U_{ss}^f - U_{ss}^i)} \quad (18)$$

Equation 16 may be written as:

$$\bar{b}_{j,scaled} = \bar{b}_j + g_j \delta u(t-d-i). \quad (19)$$

Finally, substituting the scaled b's back into the original difference Equation 7, the following expression for the approximate systematic model is obtained:

$$\delta y(t) = \quad (20)$$

$$\sum_{i=1}^{n} \bar{b}_i \delta u(t-d-i) + \sum_{i=1}^{n} g_i \delta u(t-d-i^2) \delta u(t-d-i) - \sum_{i=1}^{n} a_i \delta y(t-i)$$

The linear approximation for gain results in a quadratic difference equation for the output. Given Equation 20, the approximate systematic model is shown to be of low computational complexity. It may be used in a MPC algorithm to efficiently compute the required control moves for a transition from one steady-state to another after a set-point change. Note that this applies to the dynamic gain variations between steady-state transitions and not to the actual path values.

Control System Error Constraints

Figure 9:
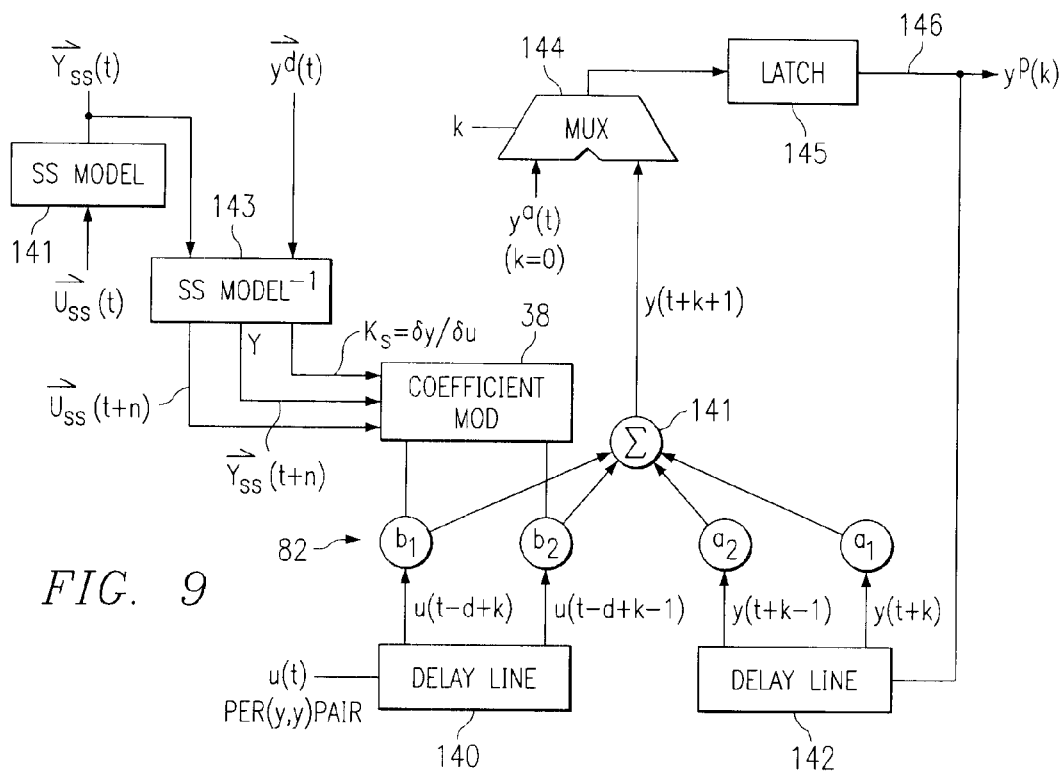
FIG. 9 illustrates a block diagram of the dynamic model.

Referring now to FIG. 9, there is illustrated a block diagram of the prediction engine for the dynamic controller 82 of FIG. 6. The prediction engine is operable to essentially predict a value of y(t) as the predicted future value y(t+1). Since the prediction engine must determine what the value of the output y(t) is at each future value between two steady-state values, it is necessary to perform these in a "step" manner. Therefore, there will be k steps from a value of zero to a value of N, which value at k=N is the value at the "horizon", the desired value. This, as will be described hereinbelow, is an iterative process, it being noted that the terminology for "(t+1)" refers to an incremental step, with an incremental step for the dynamic controller being smaller than an incremented step for the steady-state model. For the steady-state model, "y(t+N)" for the dynamic model will be, "y(t+1)" for the steady state The value y(t+1) is defined as follows:

$$y(t+1) = a_1 y(t) + a_2 y(t-1) + b_1 u(t-d-1) + b_2 u(t-d-2) \quad (21)$$

With further reference to FIG. 9, the input values u(t) for each (u,y) pair are input to a delay line 140. The output of the delay line provides the input value u(t) delayed by a delay value "d". There are provided only two operations for multiplication with the coefficients $b_1$ and $b_2$, such that only two values u(t) and u(t−1) are required. These are both delayed and then multiplied by the coefficients $b_1$ and $b_2$ and then input to a summing block 141. Similarly, the output value $y^p(t)$ is input to a delay line 142, there being two values required for multiplication with the coefficients $a_1$ and $a_2$. The output of this multiplication is then input to the summing block 141. The input to the delay line 142 is either the actual input value $y^a(t)$ or the iterated output value of the summation block 141, which is the previous value computed by the dynamic controller 82. Therefore, the summing block 141 will output the predicted value y(t+1) which will then be input to a multiplexor 144. The multiplexor 144 is operable to select the actual output $y^a(t)$ on the first operation and, thereafter, select the output of the summing block 141. Therefore, for a step value of k=0 the value $y^a(t)$ will be selected by the multiplexor 144 and will be latched in a latch 145. The latch 145 will provide the predicted value $y^p(t+k)$ on an output 146. This is the predicted value of y(t) for a given k that is input back to the input of delay line 142 for multiplication with the coefficients $a_1$ and $a_2$. This is iterated for each value of k from k=0 to k=N.

The $a_1$ and $a_2$ values are fixed, as described above, with the $b_1$ and $b_2$ values scaled. This scaling operation is performed by the coefficient modification block 38. However, this only defines the beginning steady-state value and the final steady-state value, with the dynamic controller and the optimization routines described in the present application defining how the dynamic controller operates between the steady-state values and also what the gain of the dynamic controller is. The gain specifically is what determines the modification operation performed by the coefficient modification block 38.

In FIG. 9, the coefficients in the coefficient modification block 38 are modified as described hereinabove with the information that is derived from the steady-state model. The steady-state model is operated in a control application, and is comprised in part of a forward steady-state model 141 which is operable to receive the steady-state input value $U_{ss}(t)$ and predict the steady-state output value $Y_{ss}(t)$. This predicted value is utilized in an inverse steady-state model 143 to receive the desired value $y^d(t)$ and the predicted output of the steady-state model 141 and predict a future steady-state input value or manipulated value $U_{ss}(t+N)$ and also a future steady-state input value $Y_{ss}(t+N)$ in addition to providing the steady-state gain $K_{ss}$. As described hereinabove, these are utilized to generate scaled b-values. These b-values are utilized to define the gain $k_d$ of the dynamic model. In can therefore be seen that this essentially takes a linear dynamic model with a fixed gain and allows it to have a gain thereof modified by a non-linear model as the operating point is moved through the output space.

Figure 10:
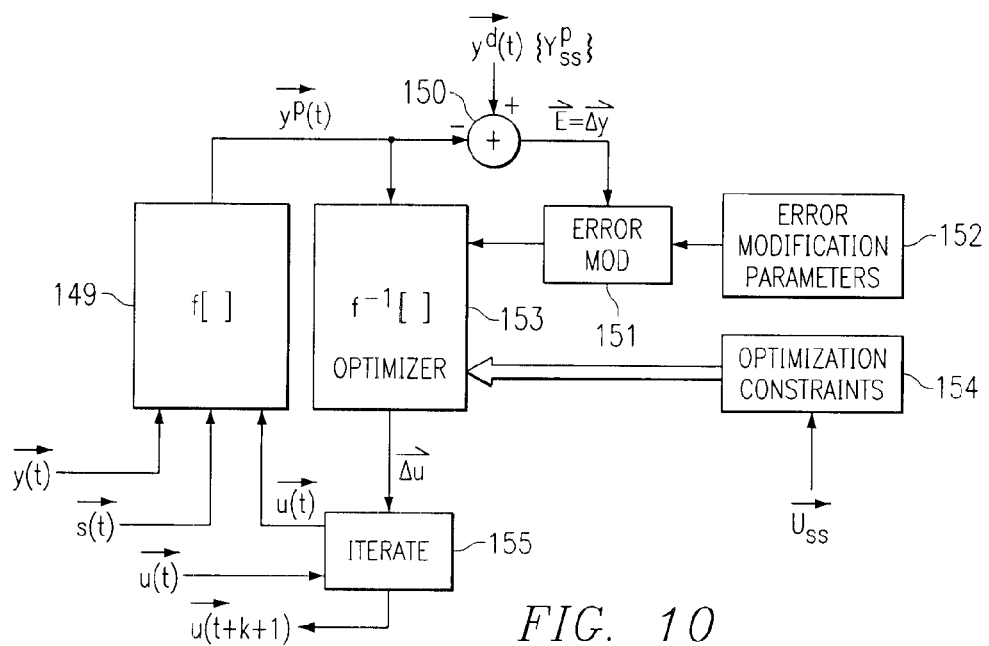
FIG. 10 illustrates a detail of the control network utilizing the error constraining algorithm of the present invention.

Referring now to FIG. 10, there is illustrated a block diagram of the dynamic controller and optimizer. The dynamic controller includes a dynamic model 149 which basically defines the predicted value $y^p(k)$ as a function of the inputs y(t), s(t) and u(t). This was essentially the same model that was described hereinabove with reference to FIG. 9. The model 149 predicts the output values $y^p(k)$ between the two steady-state values, as will be described hereinbelow. The model 149 is predefined and utilizes an identification algorithm to identify the $a_1$, $a_2$, $b_1$ and $b_2$ coefficients during training. Once these are identified in a training and identification procedure, these are "fixed". However, as described hereinabove, the gain of the dynamic model is modified by scaling the coefficients $b_1$ and $b_2$. This gain scaling is not described with respect to the optimization operation of FIG. 10, although it can be incorporated in the optimization operation.

The output of model 149 is input to the negative input of a summing block 150. Summing block 150 sums the predicted output $y^p(k)$ with the desired output $y^d(t)$. In effect, the desired value of $y^d(t)$ is effectively the desired steady-state value $Y^f_{ss}$, although it can be any desired value. The output of the summing block 150 comprises an error value which is essentially the difference between the desired value $y^d(t)$ and the predicted value $y^p(k)$. The error value is modified by an error modification block 151, as will be described hereinbelow, in accordance with error modification parameters in a block 152. The modified error value is then input to an inverse model 153, which basically performs an optimization routine to predict a change in the input value u(t). In effect, the optimizer 153 is utilized in conjunction with the model 149 to minimize the error output by summing block 150. Any optimization function can be utilized, such as a Monte Carlo procedure. However, in the present invention, a gradient calculation is utilized. In the gradient method, the gradient ∂(y)/∂(u) is calculated and then a gradient solution performed as follows:

$$\Delta u_{new} = \Delta u_{old} + \left(\frac{\partial(y)}{\partial(u)}\right) \times E \qquad (22)$$

The optimization function is performed by the inverse model 153 in accordance with optimization constraints in a block 154. An iteration procedure is performed with an iterate block 155 which is operable to perform an iteration with the combination of the inverse model 153 and the predictive model 149 and output on an output line 156 the future value u(t+k+1). For k=0, this will be the initial steady-state value and for k=N, this will be the value at the horizon, or at the next steady-state value. During the iteration procedure, the previous value of u(t+k) has the change value Δu added thereto. This value is utilized for that value of k until the error is within the appropriate levels. Once it is at the appropriate level, the next u(t+k) is input to the model 149 and the value thereof optimized with the iterate block 155. Once the iteration procedure is done, it is latched. As will be described hereinbelow, this is a combination of modifying the error such that the actual error output by the block 150 is not utilized by the optimizer 153 but, rather, a modified error is utilized. Alternatively, different optimization constraints can be utilized, which are generated by the block 154, these being described hereinbelow.

Figure 11A:
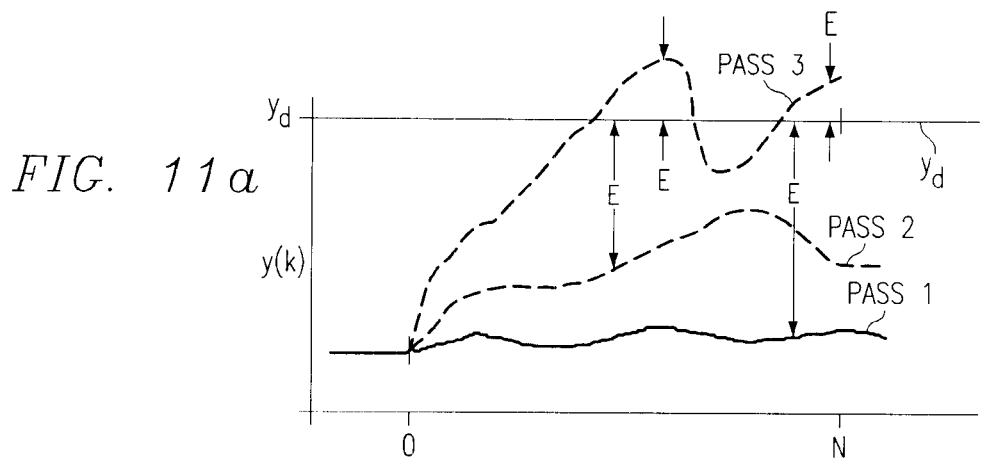
FIGS. 11a and 11b illustrate plots of the input and output during optimization.
Figure 11B:
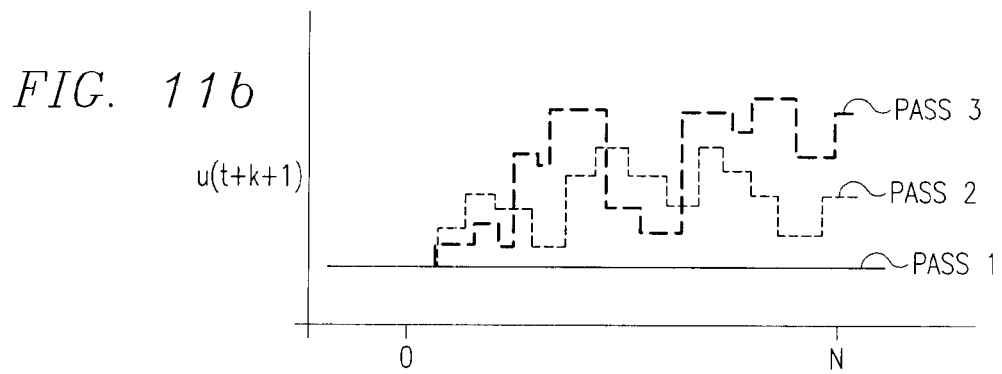

Referring now to FIGS. 11a and 11b, there are illustrated plots of the output y(t+k) and the input $u_k$(t+k+1), for each k from the initial steady-state value to the horizon steady-state value at k=N. With specific reference to FIG. 11a, it can be seen that the optimization procedure is performed utilizing multiple passes. In the first pass, the actual value $u^a$(t+k) for each k is utilized to determine the values of y(t+k) for each u,y pair. This is then accumulated and the values processed through the inverse model 153 and the iterate block 155 to minimize the error. This generates a new set of inputs $u_k$(t+k+1) illustrated in FIG. 11b. Therefore, the optimization after pass 1 generates the values of u(t+k+1) for the second pass. In the second pass, the values are again optimized in accordance with the various constraints to again generate another set of values for u(t+k+1). This continues until the overall objective function is reached. This objective function is a combination of the operations as a function of the error and the operations as a function of the constraints, wherein the optimization constraints may control the overall operation of the inverse model 153 or the error modification parameters in block 152 may control the overall operation. Each of the optimization constraints will be described in more detail hereinbelow.

Figure 12:
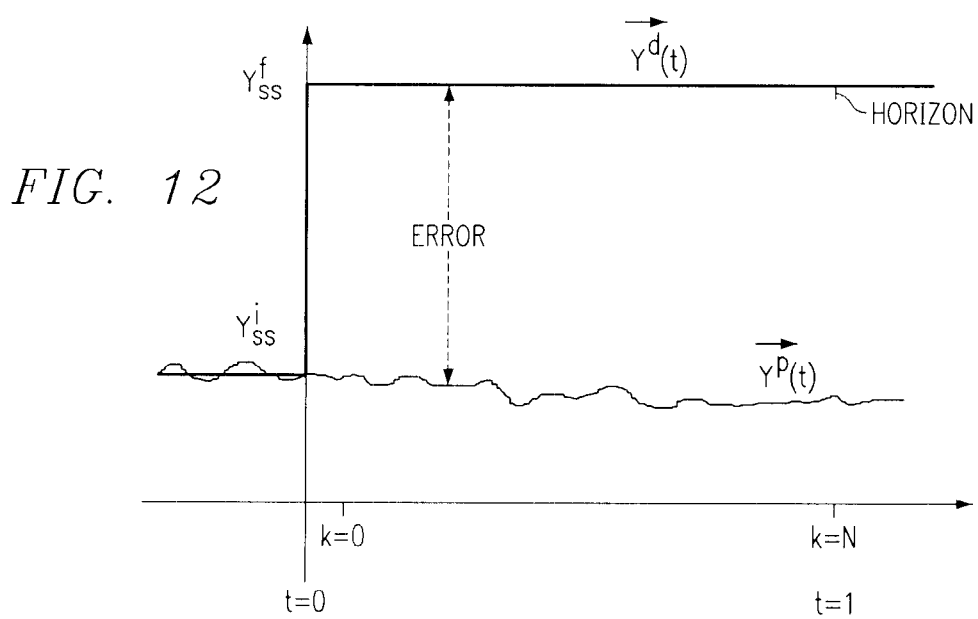
FIG. 12 illustrates a plot depicting desired and predicted behavior.

Referring now to FIG. 12, there is illustrated a plot of $y^d(t)$ and $y^p(t)$. The predicted value is represented by a waveform 170 and the desired output is represented by a waveform 172, both plotted over the horizon between an initial steady-state value $Y^i_{ss}$ and a final steady-state value $Y^f_{ss}$. It can be seen that the desired waveform prior to k=0 is substantially equal to the predicted output. At k=0, the desired output waveform 172 raises its level, thus creating an error. It can be seen that at k=0, the error is large and the system then must adjust the manipulated variables to minimize the error and force the predicted value to the desired value. The objective function for the calculation of error is of the form:

$$\min_{\Delta u_{il}} \sum_j \sum_k \left(A_j * (\bar{y}^p(t) - \bar{y}^d(t))\right)^2 \qquad (23)$$

where:
Du$_{il}$ is the change in input variable (IV) I at time interval l
A$_j$ is the weight factor for control variable (CV) j
$y^p(t)$ is the predicted value of CV j at time interval k
$y^d(t)$ is the desired value of CV j.

Trajectory Weighting

Figure 13:
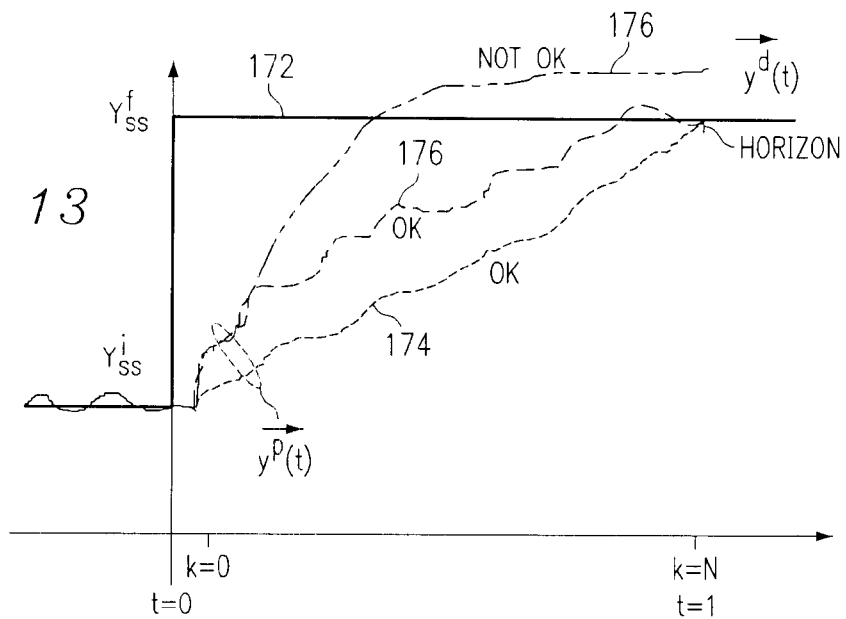
FIG. 13 illustrates various plots for controlling a system to force the predicted behavior to the desired behavior.

The present system utilizes what is referred to as "trajectory weighting" which encompasses the concept that one does not put a constant degree of importance on the future predicted process behavior matching the desired behavior at every future time set, i.e., at low k-values. One approach could be that one is more tolerant of error in the near term (low k-values) than farther into the future (high k-values). The basis for this logic is that the final desired behavior is more important than the path taken to arrive at the desired behavior, otherwise the path traversed would be a step function. This is illustrated in FIG. 13 wherein three possible predicted behaviors are illustrated, one represented by a curve 174 which is acceptable, one is represented by a different curve 176, which is also acceptable and one represented by a curve 178, which is unacceptable since it goes above the desired level on curve 172. Curves 174–178 define the desired behavior over the horizon for k=1 to N.

Figure 14:
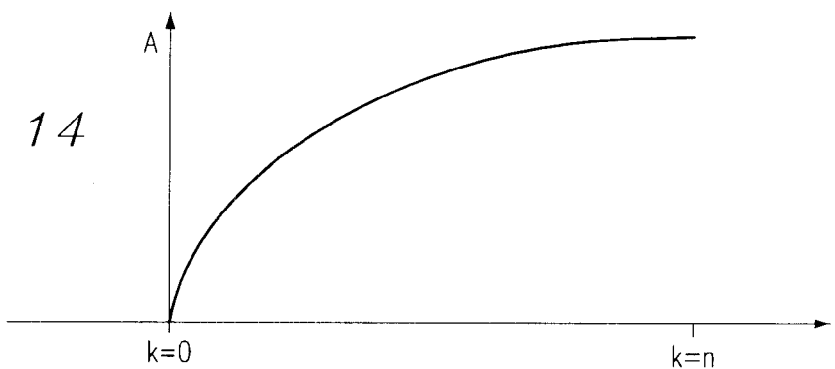
FIG. 14 illustrates a plot of the trajectory weighting algorithm of the present invention.

In Equation 23, the predicted curves 174–178 would be achieved by forcing the weighting factors $A_j$ to be time varying. This is illustrated in FIG. 14. In FIG. 14, the weighting factor A as a function of time is shown to have an increasing value as time and the value of k increases. This results in the errors at the beginning of the horizon (low k-values) being weighted much less than the errors at the end of the horizon (high k-values). The result is more significant than merely redistributing the weights out to the end of the control horizon at k=N. This method also adds robustness, or the ability to handle a mismatch between the process and the prediction model. Since the largest error is usually experienced at the beginning of the horizon, the largest changes in the independent variables will also occur at this point. If there is a mismatch between the process and the prediction (model error), these initial moves will be large and somewhat incorrect, which can cause poor performance and eventually instability. By utilizing the trajectory weighting method, the errors at the beginning of the horizon are weighted less, resulting in smaller changes in the independent variables and, thus, more robustness.

Error Constraints

Figure 15:
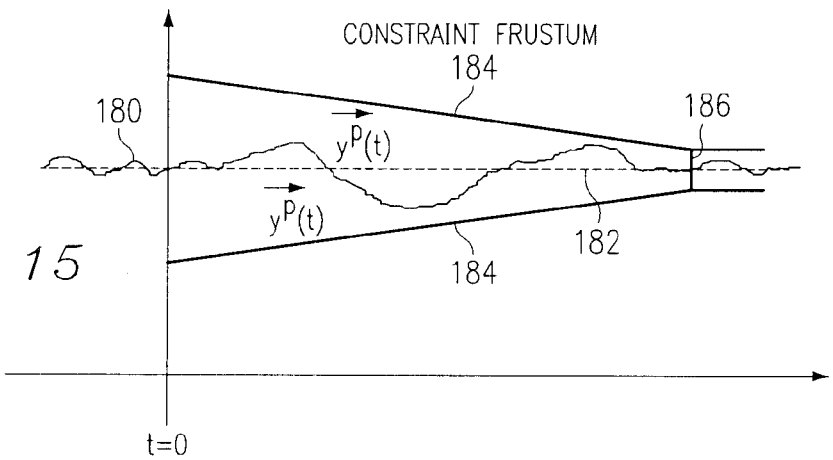
FIG. 15 illustrates a plot for the constraining algorithm.

Referring now to FIG. 15, there are illustrated constraints that can be placed upon the error. There is illustrated a predicted curve 180 and a desired curve 182, desired curve 182 essentially being a flat line. It is desirable for the error between curve 180 and 182 to be minimized. Whenever a transient occurs at t=0, changes of some sort will be required. It can be seen that prior to t=0, curve 182 and 180 are substantially the same, there being very little error between the two. However, after some type of transition, the error will increase. If a rigid solution were utilized, the system would immediately respond to this large error and attempt to reduce it in as short a time as possible. However, a constraint frustum boundary 184 is provided which allows the error to be large at t=0 and reduces it to a minimum level at a point 186. At point 186, this is the minimum error, which can be set to zero or to a non-zero value, corresponding to the noise level of the output variable to be controlled. This therefore encompasses the same concepts as the trajectory weighting method in that final future behavior is considered more important that near term behavior. The ever shrinking minimum and/or maximum bounds converge from a slack position at t=0 to the actual final desired behavior at a point 186 in the constraint frustum method.

The difference between constraint frustums and trajectory weighting is that constraint frustums are an absolute limit (hard constraint) where any behavior satisfying the limit is just as acceptable as any other behavior that also satisfies the limit. Trajectory weighting is a method where differing behaviors have graduated importance in time. It can be seen that the constraints provided by the technique of FIG. 15 requires that the value $y^P(t)$ is prevented from exceeding the constraint value. Therefore, if the difference between $y^d(t)$ and $y^P(t)$ is greater than that defined by the constraint boundary, then the optimization routine will force the input values to a value that will result in the error being less than the constraint value. In effect, this is a "clamp" on the difference between $y^P(t)$ and $y^d(t)$. In the trajectory weighting method, there is no "clamp" on the difference therebetween; rather, there is merely an attenuation factor placed on the error before input to the optimization network.

Trajectory weighting can be compared with other methods, there being two methods that will be described herein, the dynamic matrix control (DMC) algorithm and the identification and command (IdCom) algorithm. The DMC algorithm utilizes an optimization to solve the control problem by minimizing the objective function:

$$\min_{\Delta U_{il}} \sum_j \sum_k \left(A_j * (\bar{y}^P(t) - \bar{y}^D(t))\right) + \sum_i B_i * \sum_1 (\Delta U_{il})^2 \quad (24)$$

where $B_i$ is the move suppression factor for input variable I. This is described in Cutler, C. R. and B. L. Ramaker, Dynamic Matrix Control—A Computer Control Algorithm, AIChE National Meeting, Houston, Tex. (April, 1979), which is incorporated herein by reference.

It is noted that the weights $A_j$ and desired values $y^d(t)$ are constant for each of the control variables. As can be seen from Equation 24, the optimization is a trade off between minimizing errors between the control variables and their desired values and minimizing the changes in the independent variables. Without the move suppression term, the independent variable changes resulting from the set point changes would be quite large due to the sudden and immediate error between the predicted and desired values. Move suppression limits the independent variable changes, but for all circumstances, not just the initial errors.

Figure 16:
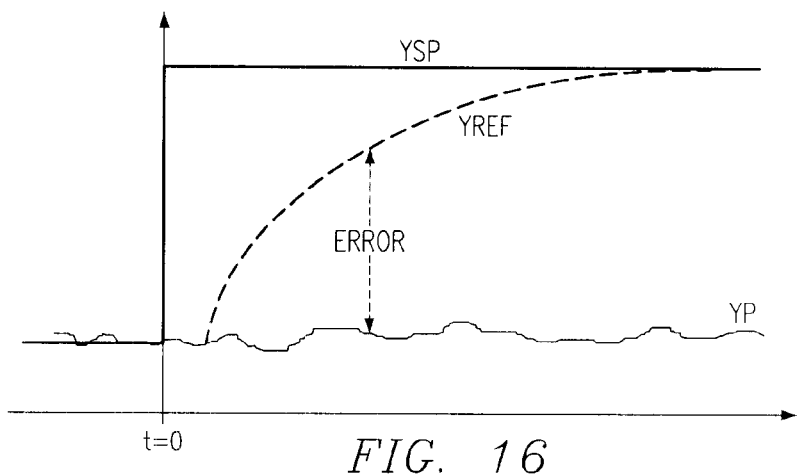
FIG. 16 illustrates a plot of the error algorithm as a function of time.

The IdCom algorithm utilizes a different approach. Instead of a constant desired value, a path is defined for the control variables to take from the current value to the desired value. This is illustrated in FIG. 16. This path is a more gradual transition from one operation point to the next. Nevertheless, it is still a rigidly defined path that must be met. The objective function for this algorithm takes the form:

$$\min_{\Delta U_{il}} \sum_j \sum_k \left(A_j * (Y^{P_{jk}} - y_{refjk})\right)^2 \quad (25)$$

This technique is described in Richalet, J., A. Rault, J. L. Testud, and J. Papon; Model Predictive Heuristic Control: Applications to Industrial Processes, Automatica, 14, 413–428 (1978), which is incorporated herein by reference. It should be noted that the requirement of Equation 25 at each time interval is sometimes difficult. In fact, for control variables that behave similarly, this can result in quite erratic independent variable changes due to the control algorithm attempting to endlessly meet the desired path exactly.

Control algorithms such as the DMC algorithm that utilize a form of matrix inversion in the control calculation, cannot handle control variable hard constraints directly. They must treat them separately, usually in the form of a steady-state linear program. Because this is done as a steady-state problem, the constraints are time invariant by definition. Moreover, since the constraints are not part of a control calculation, there is no protection against the controller violating the hard constraints in the transient while satisfying them at steady-state.

With further reference to FIG. 15, the boundaries at the end of the envelope can be defined as described hereinbelow. One technique described in the prior art, W. Edwards Deming, "Out of the Crisis," Massachusetts Institute of Technology, Center for Advanced Engineering Study, Cambridge Mass., Fifth Printing, September 1988, pages 327–329, describes various Monte Carlo experiments that set forth the premise that any control actions taken to correct for common process variation actually may have a negative impact, which action may work to increase variability rather than the desired effect of reducing variation of the controlled processes. Given that any process has an inherent accuracy, there should be no basis to make a change based on a difference that lies within the accuracy limits of the system utilized to control it. At present, commercial controllers fail to recognize the fact that changes are undesirable, and continually adjust the process, treating all deviation from target, no matter how small, as a special cause deserving of control actions, i.e., they respond to even minimal changes. Over adjustment of the manipulated variables therefore will result, and increase undesirable process variation. By placing limits on the error with the present filtering algorithms described herein, only controller actions that are proven to be necessary are allowed, and thus, the process can settle into a reduced variation free from unmerited controller disturbances. The following discussion will deal with one technique for doing this, this being based on statistical parameters.

Filters can be created that prevent model-based controllers from taking any action in the case where the difference between the controlled variable measurement and the desired target value are not significant. The significance level is defined by the accuracy of the model upon which the controller is statistically based. This accuracy is determined as a function of the standard deviation of the error and a predetermined confidence level. The confidence level is based upon the accuracy of the training. Since most training sets for a neural network-based model will have "holes" therein, this will result in inaccuracies within the mapped space. Since a neural network is an empirical model, it is only as accurate as the training data set. Even though the model may not have been trained upon a given set of inputs, it will extrapolate the output and predict a value given a set of inputs, even though these inputs are mapped across a space that is questionable. In these areas, the confidence level in the predicted output is relatively low. This is described in detail in U.S. patent application Ser. No. 08/025,184, filed Mar. 2, 1993, which is incorporated herein by reference.

Figure 17:
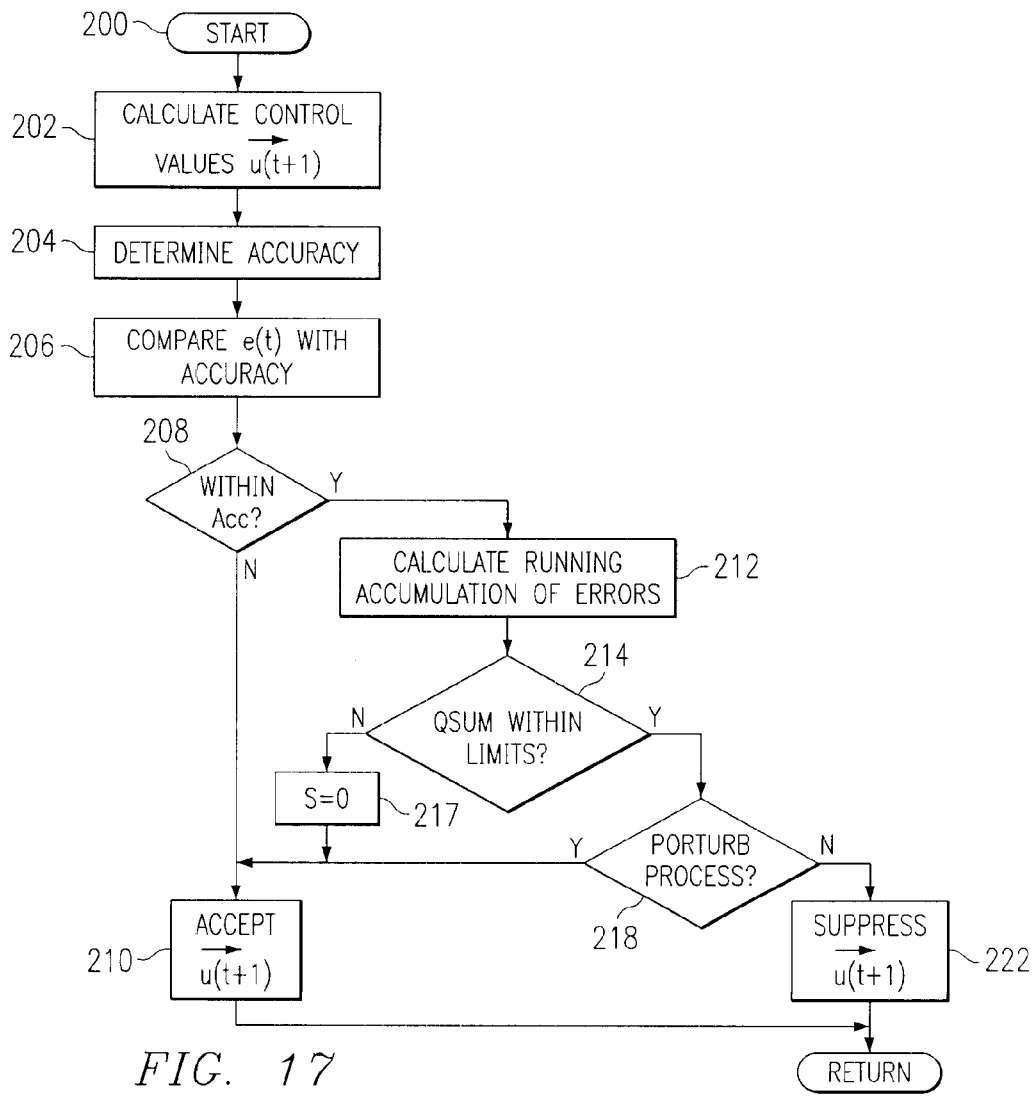
FIG. 17 illustrates a flowchart depicting the statistical method for generating the filter and defining the end point for the constraining algorithm of FIG. 15.

Referring now to FIG. 17, there is illustrated a flowchart depicting the statistical method for generating the filter and defining the end point 186 in FIG. 15. The flowchart is initiated at a start block 200 and then proceeds to a function block 202, wherein the control values u(t+1) are calculated. However, prior to acquiring these control values, the filtering operation must be a processed. The program will flow to a function block 204 to determine the accuracy of the controller. This is done off-line by analyzing the model predicted values compared to the actual values, and calculating the standard deviation of the error in areas where the target is undisturbed. The model accuracy of $e_m(t)$ is defined as follows:

$$e_m(t)=a(t)-p(t) \tag{26}$$

where:

$e_m$=model error, a=actual value p=model predicted value

The model accuracy is defined by the following equation:

$$Acc=H*\sigma_m \tag{27}$$

where:

Acc=accuracy in terms of minimal detector error $H$ = significance level = 1 67% confidence
= 2 95% confidence
= 3 99.5% confidence $\sigma_m$=standard deviation of $e_m(t)$.

The program then flows to a function block 206 to compare the controller error $e_c(t)$ with the model accuracy. This is done by taking the difference between the predicted value (measured value) and the desired value. This is the controller error calculation as follows:

$$e_c(t)=d(t)-m(t) \tag{28}$$

where:

$e_c$=controller error d=desired value m=measured value

The program will then flow to a decision block 208 to determine if the error is within the accuracy limits. The determination as to whether the error is within the accuracy limits is done utilizing Shewhart limits. With this type of limit and this type of filter, a determination is made as to whether the controller error $e_c(t)$ meets the following conditions: $e_c(t) \geq -1*Acc$ and $e_c(t) \leq +1*Acc$, then either the control action is suppressed or not suppressed. If it is within the accuracy limits, then the control action is suppressed and the program flows along a "Y" path. If not, the program will flow along the "N" path to function block 210 to accept the u(t+1) values. If the error lies within the controller accuracy, then the program flows along the "Y" path from decision block 208 to a function block 212 to calculate the running accumulation of errors. This is formed utilizing a CUSUM approach. The controller CUSUM calculations are done as follows:

$$S_{low}=\min (0, S_{low}(t-1)+d(t)-m(t)-\Sigma(m)+k) \tag{29}$$

$$S_{hi}=\max (0, S_{hi}(t-1)+[d(t)-m(t))-\Sigma(m)]-k) \tag{30}$$

where:

$S_{hi}$=Running Positive Qsum $S_{low}$=Running Negative Qsum k=Tuning factor—minimal detectable change threshold with the following defined:

Hq=significance level. Values of (j,k) can be found so that the CUSUM control chart will have significance levels equivalent to Shewhart control charts.

The program will then flow to a decision block 214 to determine if the CUSUM limits check out, i.e., it will determine if the Qsum values are within the limits. If the Qsum, the accumulated sum error, is within the established limits, the program will then flow along the "Y" path. And, if it is not within the limits, it will flow along the "N" path to accept the controller values u(t+1). The limits are determined if both the value of $S_{hi}24 +1*Hq$ and $S_{low} \leq -1*Hq$. Both of these actions will result in this program flowing along the "Y" path. If it flows along the "N" path, the sum is set equal to zero and then the program flows to the function block 210. If the Qsum values are within the limits, it flows along the "Y" path to a function block 218 wherein a determination is made as to whether the user wishes to perturb the process. If so, the program will flow along the "Y" path to the function block 210 to accept the control values u(t+1). If not, the program will flow along the "N" path from decision block 218 to a function block 222 to suppress the controller values u(t+1). The decision block 218, when it flows along the "Y" path, is a process that allows the user to re-identify the model for on-line adaptation, i.e., retrain the model. This is for the purpose of data collection and once the data has been collected, the system is then reactivated.

Figure 18:
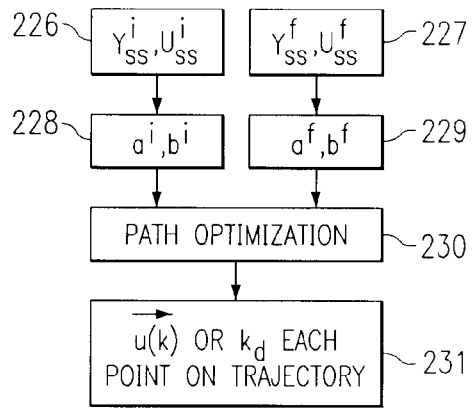
FIG. 18 illustrates a diagrammatic view of the optimization process.

Referring now to FIG. 18, there is illustrated a block diagram of the overall optimization procedure. In the first step of the procedure, the initial steady-state values $\{Y_{ss}^i, U_{ss}^i\}$ and the final steady-state values $\{Y_{ss}^f, U_{ss}^f\}$ are determined, as defined in blocks 226 and 228, respectively. In some calculations, both the initial and the final steady-state values are required. The initial steady-state values are utilized to define the coefficients $a^i$, $b^i$ in a block 228. As described above, this utilizes the coefficient scaling of the b-coefficients. Similarly, the steady-state values in block 228 are utilized to define the coefficients $a^f$, $b^f$, it being noted that only the b-coefficients are also defined in a block 229. Once the beginning and end points are defined, it is then necessary to determine the path therebetween. This is provided by block 230 for path optimization. There are two methods for determining how the dynamic controller traverses this path. The first, as described above, is to define the approximate dynamic gain over the path from the initial gain to the final gain. As noted above, this can incur some instabilities. The second method is to define the input values over the horizon from the initial value to the final value such that the desired value $Y_{ss}^f$ is achieved. Thereafter, the gain can be set for the dynamic model by scaling the b-coefficients. As noted above, this second method does not necessarily force the predicted value of the output $y^p(t)$ along a defined path; rather, it defines the characteristics of the model as a function of the error between the predicted and actual values over the horizon from the initial value to the final or desired value. This effectively defines the input values for each point on the trajectory or, alternatively, the dynamic gain along the trajectory.

Figure 18A:
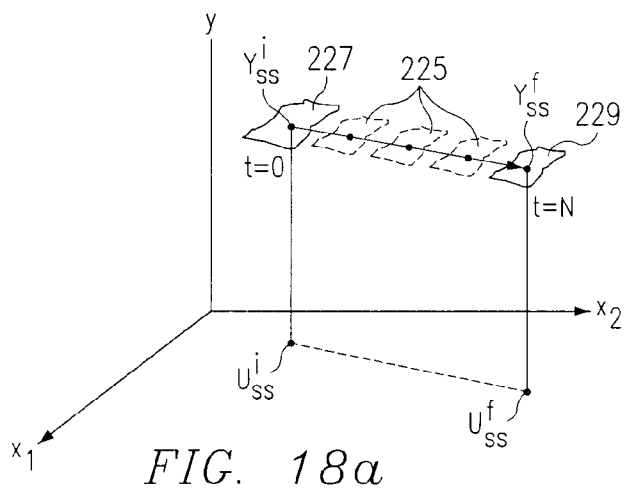
FIG. 18a illustrates a diagrammatic representation of the manner in which the path between steady-state values is mapped through the input and output space.

Referring now to FIG. 18a, there is illustrated a diagrammatic representation of the manner in which the path is mapped through the input and output space. The steady-state model is operable to predict both the output steady-state value $Y_{ss}^i$ at a value of k=0, the initial steady-state value, and the output steady-state value $Y_{ss}^i$ at a time t+N where k=N, the final steady-state value. At the initial steady-state value, there is defined a region 227, which region 227 comprises a surface in the output space in the proximity of the initial steady-state value, which initial steady-state value also lies in the output space. This defines the range over which the dynamic controller can operate and the range over which it is valid. At the final steady-state value, if the gain were not changed, the dynamic model would not be valid. However, by utilizing the steady-state model to calculate the steady-state gain at the final steady-state value and then force the gain of the dynamic model to equal that of the steady-state model, the dynamic model then becomes valid over a region 229, proximate the final steady-state value. This is at a value of k=N. The problem that arises is how to define the path between the initial and final steady-state values. One possibility, as mentioned hereinabove, is to utilize the steady-state model to calculate the steady-state gain at multiple points along the path between the initial steady-state value and the final steady-state value and then define the dynamic gain at those points. This could be utilized in an optimization routine, which could require a large number of calculations. If the computational ability were there, this would provide a continuous calculation for the dynamic gain along the path traversed between the initial steady-state value and the final steady-state value utilizing the steady-state gain. However, it is possible that the steady-state model is not valid in regions between the initial and final steady-state values, i.e., there is a low confidence level due to the fact that the training in those regions may not be adequate to define the model therein. Therefore, the dynamic gain is approximated in these regions, the primary goal being to have some adjustment of the dynamic model along the path between the initial and the final steady-state values during the optimization procedure. This allows the dynamic operation of the model to be defined. This is represented by a number of surfaces 225 as shown in phantom.

Figure 19:
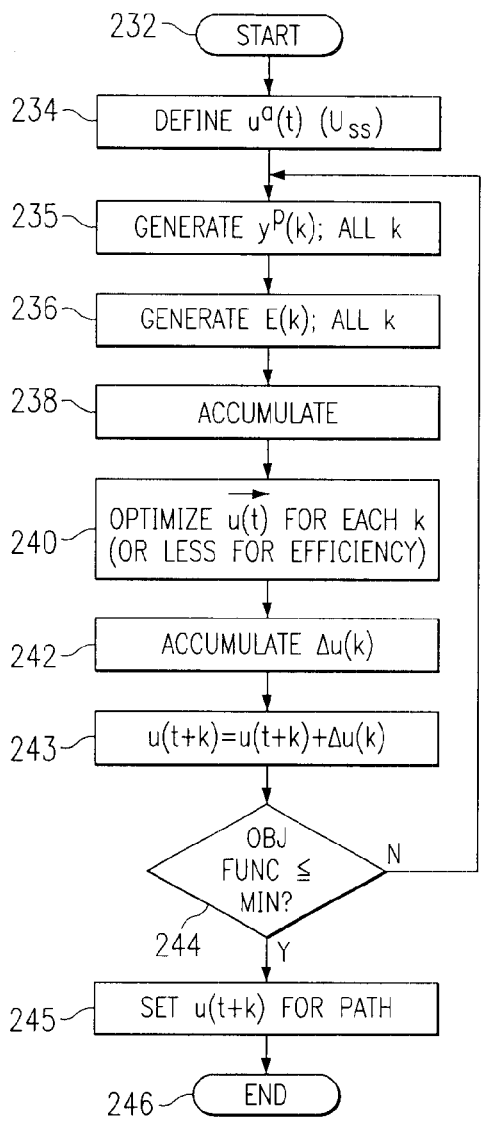
FIG. 19 illustrates a flowchart for the optimization procedure.

Referring now to FIG. 19, there is illustrated a flow chart depicting the optimization algorithm. The program is initiated at a start block 232 and then proceeds to a function block 234 to define the actual input values $u^a(t)$ at the beginning of the horizon, this typically being the steady-state value $U_{ss}$. The program then flows to a function block 235 to generate the predicted values $y^p(k)$ over the horizon for all k for the fixed input values. The program then flows to a function block 236 to generate the error E(k) over the horizon for all k for the previously generated $y^p(k)$. These errors and the predicted values are then accumulated, as noted by function block 238. The program then flows to a function block 240 to optimize the value of u(t) for each value of k in one embodiment. This will result in k-values for u(t). Of course, it is sufficient to utilize less calculations than the total k-calculations over the horizon to provide for a more efficient algorithm. The results of this optimization will provide the predicted change Δu(t+k) for each value of k in a function block 242. The program then flows to a function block 243 wherein the value of u(t+k) for each u will be incremented by the value Δu(t+k). The program will then flow to a decision block 244 to determine if the objective function noted above is less than or equal to a desired value. If not, the program will flow back along an "N" path to the input of function block 235 to again make another pass. This operation was described above with respect to FIGS. 11a and 11b. When the objective function is in an acceptable level, the program will flow from decision block 244 along the "Y" path to a function block 245 to set the value of u(t+k) for all u. This defines the path. The program then flows to an End block 246.

Steady State Gain Determination

Referring now to FIG. 20, there is illustrated a plot of the input space and the error associated therewith. The input space is comprised of two variables $x_1$ and $x_2$. The y-axis represents the function $f(x_1, x_2)$. In the plane of $x_1$, and $x_2$, there is illustrated a region 250, which represents the training data set. Areas outside of the region 250 constitute regions of no data, i.e., a low confidence level region. The function Y will have an error associated therewith. This is represented by a plane 252. However, the error in the plane 250 is only valid in a region 254, which corresponds to the region 250. Areas outside of region 254 on plane 252 have an unknown error associated therewith. As a result, whenever the network is operated outside of the region 250 with the error region 254, the confidence level in the network is low. Of course, the confidence level will not abruptly change once outside of the known data regions but, rather, decreases as the distance from the known data in the training set increases. This is represented in FIG. 21 wherein the confidence is defined as α(x). It can be seen from FIG. 21 that the confidence level α(x) is high in regions overlying the region 250.

Once the system is operating outside of the training data regions, i.e., in a low confidence region, the accuracy of the neural net is relatively low. In accordance with one aspect of the preferred embodiment, a first principles model g(x) is utilized to govern steady-state operation. The switching between the neural network model f(x) and the first principle models g(x) is not an abrupt switching but, rather, it is a mixture of the two.

The steady-state gain relationship is defined in Equation 7 and is set forth in a more simple manner as follows:

$$K(\vec{u}) = \frac{\partial (f(\vec{u}))}{\partial (\vec{u})} \tag{31}$$

A new output function Y(u) is defined to take into account the confidence factor α(u) as follows:

$$Y(\vec{u}) = \alpha(\vec{u}) \cdot f(\vec{u}) + (1 - \alpha(\vec{u})) g(\vec{u}) \tag{32}$$

where:
α(u)=confidence in model f(u)
α(u) in the range of 0→1
α(u)∈{0,1}
This will give rise to the relationship:

$$K(\vec{u}) = \frac{\partial (Y(\vec{u}))}{\partial (\vec{u})} \tag{33}$$

In calculating the steady-state gain in accordance with this Equation utilizing the output relationship Y(u), the following will result:

$$K(\vec{u}) = \frac{\partial(\alpha(\vec{u}))}{\partial(\vec{u})} \times F(\vec{u}) + \alpha(\vec{u})\frac{\partial(F(\vec{u}))}{\partial(\vec{u})} + \qquad (34)$$

$$\frac{\partial(1-\alpha(\vec{u}))}{\partial(\vec{u})} \times g(\vec{u}) + (1-\alpha(\vec{u}))\frac{\partial(g(\vec{u}))}{\partial(\vec{u})}$$

Referring now to FIG. 22, there is illustrated a block diagram of the embodiment for realizing the switching between the neural network model and the first principles model. A neural network block 300 is provided for the function f(u), a first principle block 302 is provided for the function g(u) and a confidence level block 304 for the function α(u). The input u(t) is input to each of the blocks 300–304. The output of block 304 is processed through a subtraction block 306 to generate the function 1−α(u), which is input to a multiplication block 308 for multiplication with the output of the first principles block 302. This provides the function (1−α(u))*g(u). Additionally, the output of the confidence block 304 is input to a multiplication block 310 for multiplication with the output of the neural network block 300. This provides the function f(u)*α(u). The output of block 308 and the output of block 310 are input to a summation block 312 to provide the output Y(u).

Referring now to FIG. 23, there is illustrated an alternate embodiment which utilizes discreet switching. The output of the first principles block 302 and the neural network block 300 are provided and are operable to receive the input x(t). The output of the network block 300 and first principles block 302 are input to a switch 320, the switch 320 operable to select either the output of the first principals block 302 or the output of the neural network block 300. The output of the switch 320 provides the output Y(u).

The switch 320 is controlled by a domain analyzer 322. The domain analyzer 322 is operable to receive the input x(t) and determine whether the domain is one that is within a valid region of the network 300. If not, the switch 320 is controlled to utilize the first principles operation in the first principles block 302. The domain analyzer 322 utilizes the training database 326 to determine the regions in which the training data is valid for the network 300. Alternatively, the domain analyzer 320 could utilize the confidence factor α(u) and compare this with a threshold, below which the first principles model 302 would be utilized.

Non-linear Mill Control

Overall, model predictive control (MPC) has been the standard supervisory control tool for such processes as are required in the cement industry. In the cement industry, particulate is fabricated with a kiln/cooler to generate raw material and then to grind this material with a mill. The overall kiln/cooler application, in the present embodiment, utilizes a model of the process rather than a model of the operator. This model will provide continuous regulation and disturbance rejection which will allow the application to recover from major upsets, such as coating drop three times faster than typical operator intervention.

In general, mills demonstrate a severe non-linear behavior. This can present a problem in various aspects due to the fact that the gains at different locations within the input space can change. The cement kilns and coolers present a very difficult problem, in that the associated processes, both chemical and physical, are in theory simple, but in practice complex. This is especially so when commercial issues such as quality and costs of production are considered. The manufacturing of cement, and its primary ingredient, clinker, has a number of conflicting control objectives, which are to maximize production, minimize costs, and maximize efficiency, while at the same time maintaining minimum quality specifications. All of this optimization must take place within various environmental, thermodynamic and mechanical constraints.

A primary technique of control for clinker has been the operator. As rotary cement kilns and automation technology evolve, various automation solutions have been developed for the cement industry. These solutions have been successful to a greater or lessor extent. In the present application, the process is modeled, rather than the operator, and model predictive control is utilized. Moves are made every control cycle to the process based on continuous feedback of key measurements. This gives rise to a continuous MPC action, as opposed to the intermittent, albeit frequent moves made by the typical expert system. In addition, as will be described hereinbelow, the approach described utilizes full multivariable control (MVC) techniques, which take into account all coupled interactions in the kiln/cooler process.

The cement mill is utilized to manufacture the various grades of cement after processing of the raw material, which are defined by their chemical composition and fineness (particle size distribution). The control objectives are thus to maximize production at minimum cost, i.e., low energy consumption for the various product grades, chemical compositions and specified fineness. In general, the mill utilizes a closed circuit where separators in the feed-back are utilized to classify the mill output into oversized and undersized product streams. The oversized stream, which does not conform to specification required for correct cement strength, is fed back into the mill for further grinding and size reduction. Depending upon the type of mill, controls include fresh feed, recirculating-load, as well as separator speed, all of which are used by the operator to control fineness, energy consumption and throughput.

In general, the mill grinding equations take the form of:

$$ln(P) = k_1 + k_2 * F$$

where:
P=particle size
F=feed rate
$k_1$ and $k_2$ are constants.

It has generally been stated in the literature that grinding model equations are non-linear and hence, direct application of linear control theory is not possible. The primary reason for this is that the operation of the plant is only non-linear in very small regions of the input space. Once the process has traversed, i.e., "stepped," from one portion of the input space to another portion thereof, the overall model changes, i.e., it is non-linear. This lends itself to non-linear modeling techniques. However, most control systems are linear in nature, especially those that model the dynamics of the plant.

Figure 24:
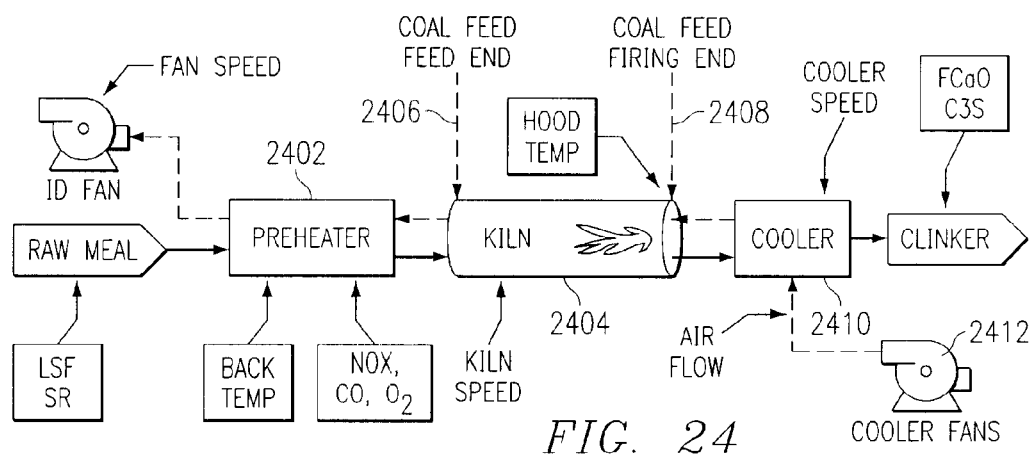
FIG. 24 illustrates block diagram of a kiln, cooler and preheater.

Referring now to FIG. 24, there is illustrated a diagrammatic view of the kiln/cooler configuration and the selected instrumentation utilized for optimal MPC control. This kiln/cooler consists of a five-stage suspension pre-heater kiln, with back-end firing (approximately fifteen percent of total firing). The cooler is a grate type with a conversion upgrade on the first section. It has on-line analyzers for NOx, $O_2$ and CO located at the top of a preheater 2402 which receives raw meal therein. The output of the preheater is input to a kiln 2404. There is provided a coal feed on an input 2406, the feed end and a coal feed 2408 on the firing end. The output of the kiln is input to a cooler 2410 which has an input cooler fan 2412. The output of the cooler provides the clinker. The overall plan is fully instrumented with all necessary measurements, e.g., temperature, pressure and flow measurements such as coal, raw meal and grate air. The quality of the clinker production is maintained by the analysis of hourly samples of the raw meal feed, clinker and coal. This is supported by a semi-automated sampling system, and various modern laboratory infrastructure.

The system is controlled with an MPC controller (not shown) that consists of the MPC control engine as described hereinabove, as well as a real-time expert system that performs a variety of pre and post processing of control signals as well as various other functions such as MPC engine control, noise filtering, bias compensation and real-time trending. This system will also perform set point tracking for bumperless transfer, and adaptive target selection. This allows for the controller tuning parameters to be changed according to various business and/or process strategies.

The MPC control solution as discussed hereinbelow, is designed to achieve two primary control goals, the first being optimal operation and stabilization of the kiln/cooler, and the second being clinker quality control. This control must also achieve an optimal balance between quality and production, which implies tying these processes together and then reducing costs in the presence of constraints.

This multivariate problem and optimization together with extreme variability (chaotic) plant behavior motivates the use of MPC where the emphasis switches from modeling operators to modeling the basic processes. In this context the disturbances and the problems that could crop up in operations are compensated for automatically due the inherent structure of the MPC. This results in a powerful concept because unlike fuzzy logic, much less effort is required to define how to react to a problem, and the problem is reduced to mathematics where error reduction is the objective.

This is in contract to rules and fuzzy logic where given the large number of permutations of plant states, problems and the method to handle them, the definition, management and robustness of rules becomes a problem itself. For example the definition of "hot" for say the hood temperature itself becomes a problem because it depends on the plant state and could have multiple definitions, and given a time trajectory may even fall out of the definition of hot. In this regard a model of the process is required and hence MPC.

Kiln process are nevertheless quite complex in their own right, and with MPC the model will inherently be only an approximation. However, the inherent robustness of MPC compensates quite well for model mismatches, and such mismatches can be identified and corrected quite easily.

Disturbance Rejection and Dynamics

Clinker quality is determined primarily by the characteristics of the kiln feed, as well as kiln thermodynamic conditions. Thus, stable control of the chemical composition of the kiln feed e.g., LSF, and the thermodynamic profile of the plant are necessary requirements.

LSF deviations in particular can be a major source of disturbances as LSF effects the "burnability" and hence the thermodynamics. In such cases it is usually only an hour after receipt of lab results that the operator will know why temperatures dropped and, for example, free-limes increased. It is also highly likely that compensation was not optimal because the results of alterative solutions were simply not known, and conventional kiln operations dictate corrective action that errs on the side of comfort. Because of forward predictions into the future, as will be described hereinbelow MPC is particularly good at this type of disturbance rejection, as corrective actions can be taken before hand and the solution will exploit the dynamics of the process to bring variables back on target as fast as possible. For example, the MPC controller may not have increased coal to compensate for dropping temperatures, but rather maximized the use of secondary air from the cooler, a possibly faster and more economic reaction to increasing fuel. In addition, coal set point moves introduce more disturbances into the kiln, and the forward prediction in MPC would include this because of the MPC knowledge of the dynamics.

Efficiency and Secondary Air

The thermodynamic processes for clinker production are the preheating and calcining of the raw meal, followed by the endothermic, and exothermic sintering processes where the various complexes of clinker such as calcium-silicates (C2S and C3S) are produced. Each one of these processes requires fairly specific thermodynamic and metallurgical conditions for the process to take place.

The reduction of energy consumption is a dominant objective in these processes, and the preheater and cooler are vital to achieving this objective. The preheater is used to exploit as much of the heat from the kiln before being wasted to atmosphere, (calcining). Similarly, maximum effort is used to recover as much of the energy released from the cooling of the product and to re-introduce it back into the kiln, as "secondary" air. With grate coolers, the leveraging of secondary air becomes a sub objective to the maximization of this energy recovery, the control of which is primarily through the grate speed and grate air flow. However the dynamics in the kiln greatly affect the cooler and vice versa. The ID-fan also plays an important role, but the ID-fan also has another major role, which is the control of the combustion process, which is indicated by the $O_2$ CO and NOx, and which is vital to good clinker production.

It has been recognized for the purposes of the present disclosure that counter current flow of air and material in the preheater, kiln and cooler form a number of complex feed-forward and feedback thermodynamic process loops, which are difficult to understand and hence control. Compounding this issue is the number of dead-times in these loops. For example, the residence time in the kiln is about 45 minutes, while that of the cooler is about 15 minutes. Conversely some of the process response times are of the order of seconds. This large range of varying time constants and dead time makes it very difficult for the operator to take into account and remember the results of certain moves that will take effect far into the future.

An example of this complexity is a scenario where the operator increases kiln feed in order to increase production. The greater mass of cooler material, which begins to flow into the system, will first cause preheater temperatures to drop almost immediately, and hood temperatures to rise and then drop some time later. This scenario is extremely simplistic and is made on the assumption that all other control variables remain constant. In reality the experienced operator or any other advanced control system will try to compensate for this by, for example, increasing the ID-fan and adjusting other control variables such as increasing coal to compensate for the greater energy requirement. In addition, the kiln speed will be increased in order to maintain a proper bed depth, all of which create major fluctuations to the material flow in the cooler, and hence the amount of air and heat being introduced into the kiln as well as secondary air, which itself becomes a major feed-back disturbance the kiln heat balance.

These process fluctuations do not only occur during the period of time, the duration of which is related to the dead times and time constants associated with these processes, but are observed to repeat a number of times afterwards, due to feedback. These effects will with time be lost either in the process noise or in the fluctuations of newer disturbances. Also depending on the operational state of the kiln these disturbances could cause the whole heat balance to become unstable, thus causing extremely high or low temperatures, and in general operator over-compensation.

It has also been noticed that the kiln/cooler is a set of complex interacting processes and taking the correct and optimal control actions becomes very difficult. The MPC control technique of the present disclosure is that, given a robust multivariable controller, as well as models of the fundamental process responses, the kiln can be controlled more rigorously, and most disturbances measured and unmeasured taken into cognizance fairly far into the future. This helps to stabilize the kiln, minimize operator over-compensation, as well as ensuring fast response to disturbances, thus reducing reject material and lowering fuel consumption.

The MPC is defined in two primary phases the first being the modeling phase in which the models of the kiln processes are developed. The second phase is the deployment phase, where the models are commissioned and refined to a point where satisfactory control can be obtained. Central to commissioning is the tuning where the controller is tweaked to provide the desired control and optimization. For example this could be: maximum production at the expense of quality, or optimal quality at the expense of efficiency.

The MPC models are developed from the analysis of test and process data, together with knowledge from the plant operators and other domain experts. The result is a matrix of time responses, where each response reflects the dynamic interaction of a controlled variable to a manipulated variable.

The tuning involves the selection of targets (set points), weighting factors and various constraints for each variable. This determines how the controller will solve the control problem at any given time. The control of the kiln and its optimization within the above set of constraints is solved every control cycle.

The solution chosen in a particular control cycle may not seem to be necessarily optimal at that given time, but will be optimal within the solution space which has temporal as well as spatial dimensions. Thus the control solution is a series of trajectories into the future, where the whole solution is optimized with time. The very nature of optimal control in real time does not allow for a guarantee of a global optimal solution. However the calculation of an optimal solution within a finite amount of time is itself a class of optimization.

Some of the tuning parameters, which can be changed during operations, include:

1) Targets. Targets can be set for both controlled and manipulated variables, and the MPC controller will try and force all variables to their desired targets. In particular setting a target for a manipulated variable such as coal allows for optimization, and in particular efficiency, because the controller will continually seek a lower coal flow while maintaining production and quality. For some variables such as $O_2$, a target may not be necessary, and the variables will be allowed to roam within a band of constraints.

2) Priorities. Setting relative priorities between manipulated variables and controlled variables allows the controller to prioritize which are more important problems to solve, and what type of solution to apply. Underspecified multivariable control (more manipulated variables than controlled variables, as is the case in this application) implies that for every problem there will be more than one solution, but within constraints one solution will generally be more optimal than others. For example, too high a hood temperature can be controlled by, (a) reducing fuel, (b) increasing the grate speed, or (c) increasing cooler airflow, or a combination of the above.

3) Hard Constraints. Setting upper and lower hard constraints for each process variable, for example, minimum and maximum grate speed. These values which are usually defined by the mechanical and operational limitations of the grate. Maintaining these constraints is obviously realizable with controlled variables such as ID-fan speed, but is more difficult to achieve with, for example, hood temperature. However when hood temperature exceeds a upper hard constraint of say 1200° C., the controller will switch priority to this temperature excursion, and all other control problems will "take a back seat" to the solution required to bring this temperature back into the allowable operating zone.

4) Soft upper and lower constraints. If any process variable penetrates into the soft constraint area, penalties will be incurred that will begin to prioritize the solution of this problem. Continuous penetration into this area will cause increasing prioritization of this problem, thus in effect creating an adaptive prioritization, which changes with the plant state.

5) Maximum rate of change constraints. These parameters are only applicable to the manipulated variables, and generally reflect a mechanical of physical limitation of the equipment used, for example maximum coal feed rate.

From a clinker production point of view the functions of the MPC application can be viewed as follows:

1) Kiln Combustion Control where manipulated variables such as ID-fan speed and fuel-flow are manipulated to control primarily $O_2$. When CO rises above a specified threshold constraint, it will override and become the controlled variable. The controller is tuned to heavily penalize high CO values, steer the CO back into an acceptable operating region, and rapidly return to $O_2$ control.

2) Kiln Thermal "Hinge Point" Control adjusts total coal, cooler grate speed, and cooler fans to control the hood temperature. The hood temperature is conceptualized as the "hinge" point on which the kiln temperature profile hangs. The controller is tuned to constantly minimize cooler grate speed and cooler fans, so that heat recovery from the cooler is maximized, while minimizing moves to coal.

3) Kiln Thermal "Swing Arm" Control adjusts percent coal to the kiln backend, in order to control clinker free lime based on hourly lab feedback. This control function is about three times slower than the hinge point control, which maintains hood temperature at a fixed target. The "swing arm effect" raises or lowers the back end temperature with a constant firing end temperature to compensate for changes in free lime. This is in effect part of the quality control.

Kiln combustion control, kiln thermal hinge point control, and kiln thermal swing arm control are implemented in a single MPC controller. Kiln speed is included as a disturbance variable, as the production philosophy, in one embodiment, calls for setting a production rate to meet various commercial obligations. This means that any changes to kiln speed and hence production rate by the operator will be taken into account in the MPC predictions, but the MPC controller will not be able to move kiln speed.

The control system allows for customization of the interface between the plant and the MPC special control functions, the special control functions implemented including:

1) Total Coal Control allows the operator to enter a total coal or fuel flow set point. The control system "wrapper" splits the move to the front and back individual coal flow controllers while maintaining the percent of coal to the back constant. The purpose of this control function is to allow heating and cooling of the kiln while maintaining a constant energy profile from the preheaters through to the firing end of the kiln. This provides a solid basis for the temperature "hinge point" advanced control function previously described.

2) Percent Coal to the Back Control allows the operator to enter a percent coal to the back target and implements the moves to the front and back coal flow controllers to enforce it. The purpose of this control is to allow the back end temperature to be swung up or down by the thermal "swing arm" advanced control function.

3) Feed-to-Speed Ratio Control adjusts raw meal feed to the kiln to maintain a constant ratio to kiln speed. The purpose of this controller is to maintain a constant bed depth in the kiln, which is important for long-term stabilization.

4) Cooler Fans Control is a move splitter that relates a single generic cooler air fans set point to actual set points required by n cooler air fans. The expert system wrapper through intelligent diagnostics or by operator selection can determine which of the air cooler fans will be placed under direct control of the MPC controller, thus allowing for full control irrespective of the (for example) maintenance being undertaken on any fans.

5) Gas analyzer selection. The control system automatically scans the health of the gas analyzers, and will switch to the alternative analyzer should the signals become "unhealthy". In addition the control system is used to intelligently extract the fundamental control signals from the $O_2$ and CO readings, which are badly distorted by purge spikes etc.

Figure 25:
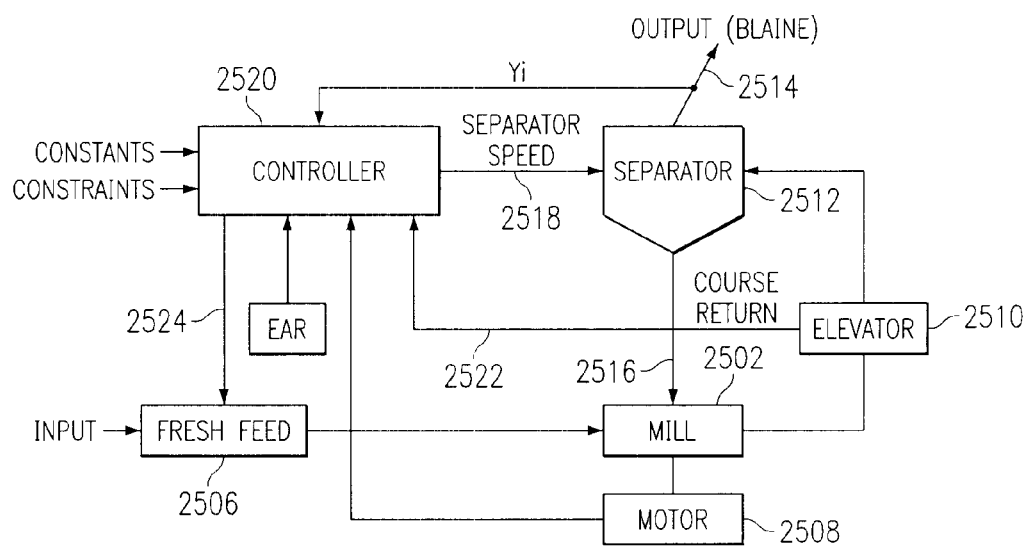
FIG. 25 illustrates a block diagram of a non-linear controlled mill.

Referring now to FIG. 25, there is illustrated a block diagram of the non-linear mill and the basic instrumentation utilized for advanced control therein. The particle size overall is measured as "Blaine" in $cm^2/gm$, and is controlled by the operator through adjustment of the fresh feed rate and the separator speed. The mill is a ball mill, which is referred to by reference numeral 2502. The fresh feed is metered by a fresh feed input device 2506 which receives mined or processed material into the mill 2502, which mill is a mechanical device that grinds this mined or processed material. In this embodiment, the mill is a ball mill, which is a large cylinder that is loaded with steel balls. The mill 2502 rotates and is controlled by a motor 2508 and, as the material passes therethrough, it is comminuted to a specified fineness or Blaine. The output of the mill is input to an elevator 2510 which receives the output of the mill 2502 and inputs it to a separator 2512. This is a feedback system which is different than an "open circuit" mill and is referred to as a "closed circuit" mill. The mill product is fed into the separator 2512, which separator 2512 then divides the product into two streams. The particles that meet product specification are allowed to exit the system as an output, represented by a reference numeral 2514, whereas the particles that are too large are fed back to the input of the mill 2502 through a return 2516 referred to as the course return.

There are provided various sensors for the operation of the mill. The separator speed is controlled by an input 2518 which signal is generated by a controller 2520. The elevator 2510 provides an output 2522, which constitutes basically the current required by the elevator 2510. This can be correlated to the output of the mill, as the larger the output, the more current that is required to lift it to the separator 2512. Additionally, the motor 2508 can provide an output. There is additionally provided an "ear," which is a sonic device that monitors the operation of the mill through various sonic techniques. It is known that the operation of the mill can be audibly detected such that operation within certain frequency ranges indicates that the mill is running well and in other frequency ranges that it is not running well, i.e., it is not optimum.

Overall, the mill-separator-return system is referred to as a "mill circuit." The main control variable for a mill circuit is product particle size, the output, and fresh feed is manipulated to control this variable. A secondary control variable is return and separator speed is manipulated to control this variable. There are also provided various constants as inputs and constraints for the control operation. This controller 2520 will also control fresh feed on a line 2524.

The response of particle size to a move in fresh feed is known to be slow (one-two hours) and is dominated by dead time. Where a dead time to time constant ratio exceeding 0.5 is known to be difficult to control without model predictive control techniques, documents ratios for the response of particle size to a move in fresh feed includes 0.9 and 1.3.

In the case of a closed-circuit mill, a move to fresh feed effects not only the product particle size, but also the return flow. Also, a move to separator speed effects not only the return flow, but also the particle size. This is a fully interactive multi-variable control problem.

The controller adjusts fresh feed and separator speed to control Blaine and return. It also includes motor and sonic ear as outputs, and the sonic ear is currently used as a constraint variable. That means when the sonic ear decibel reading is too high then fresh feed is decreased. In this way the controller maximizes feed to the sonic ear (choking) constraint.

Referring now to FIG. 26, there is illustrated a dynamic model matrix for the fresh feed and the separator speed for the measured variables of the Blaine Return Ear and motor. It can be seen that each of these outputs has a minimum and maximum gain associated therewith dead-time delay and various time constants.

Figure 27:
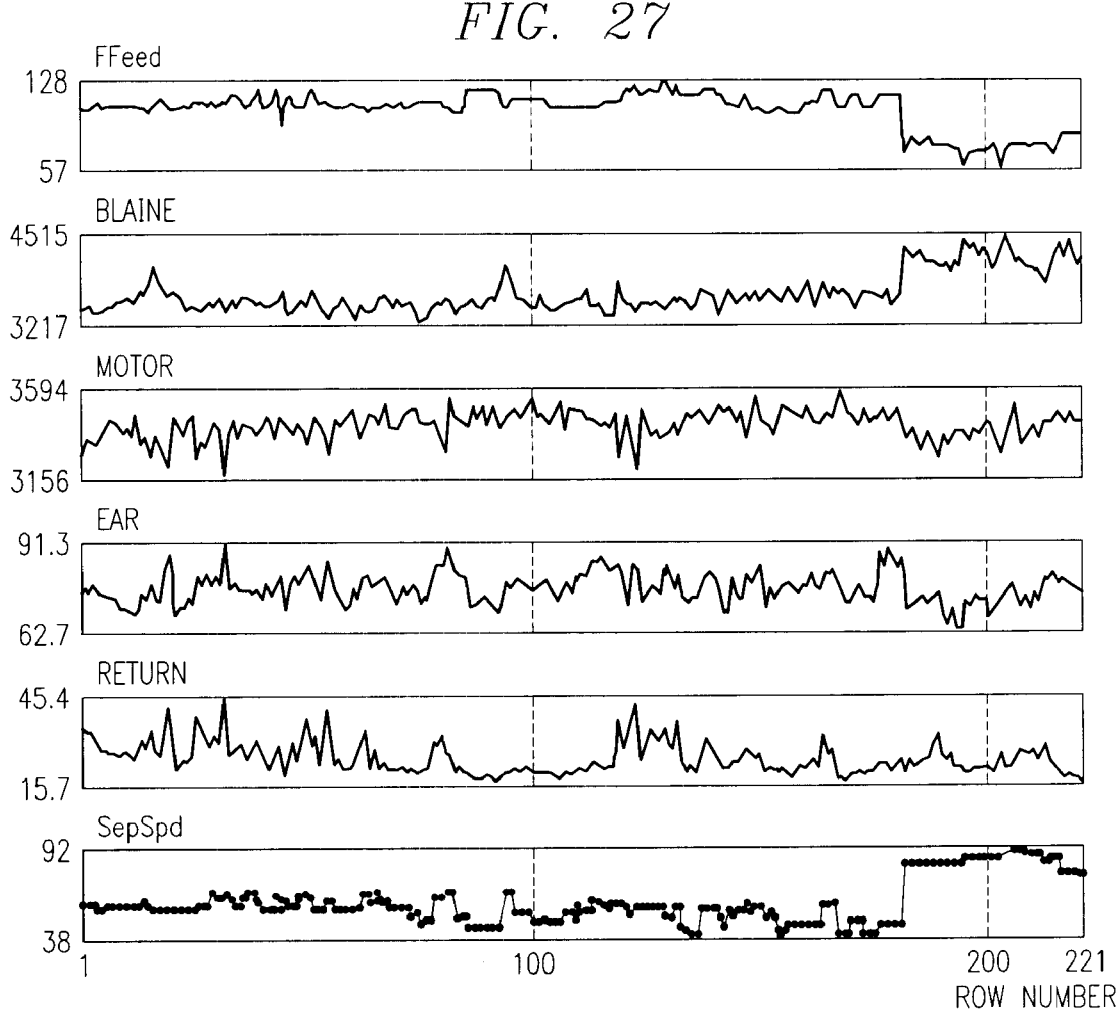
FIG. 27 illustrates historical modeling data for the mill.

Referring now to FIG. 27, there is illustrated a plot of log sheet data utilized to generate a gain model for the controller 2520. This constitutes the historical data utilized to train the steady state non-linear model.

In general, the operation described hereinabove utilizes a non-linear controller which provides a model of the dynamics of the plants in a particular region. The only difference in the non-linear model between one region of the input space to a second region of the input space is that associated with the dynamic gain "k." This dynamic gain varies as the input space is traversed, i.e., the model is only valid over a small region of the input space for a given dynamic gain. In order to compensate for this dynamic gain of a dynamic linear model, i.e., the controller, a non-linear steady state model of the overall process is utilized to calculate a steady-state gain "K" which is then utilized to modify the dynamic gain "k." This was described in detail hereinabove.

In order to utilize this model, it is necessary to first model the non-linear operation of the process, i.e., determining a non-linear steady state model, and then also determine the various dynamics of the system through "step testing." The historical data provided by the log sheets of FIG. 27 provide this information which can then be utilized to train the non-linear steady state model.

Figure 28A:
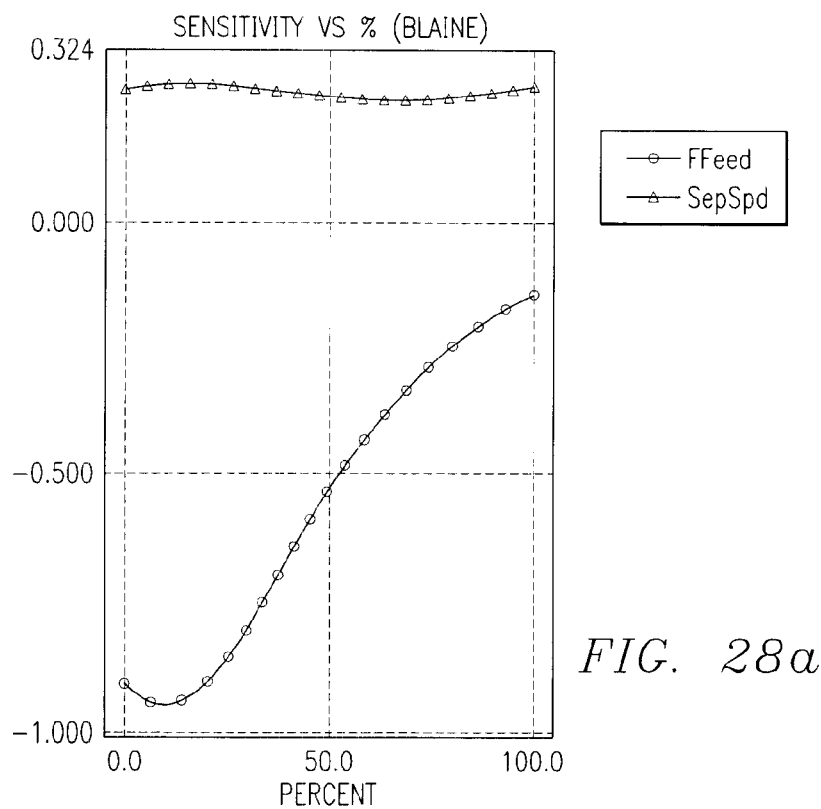
FIGS. 28a and 28b illustrate diagrams of sensitivity versus the percent of the Blaine and the percent of the Return, respectively.
Figure 28B:
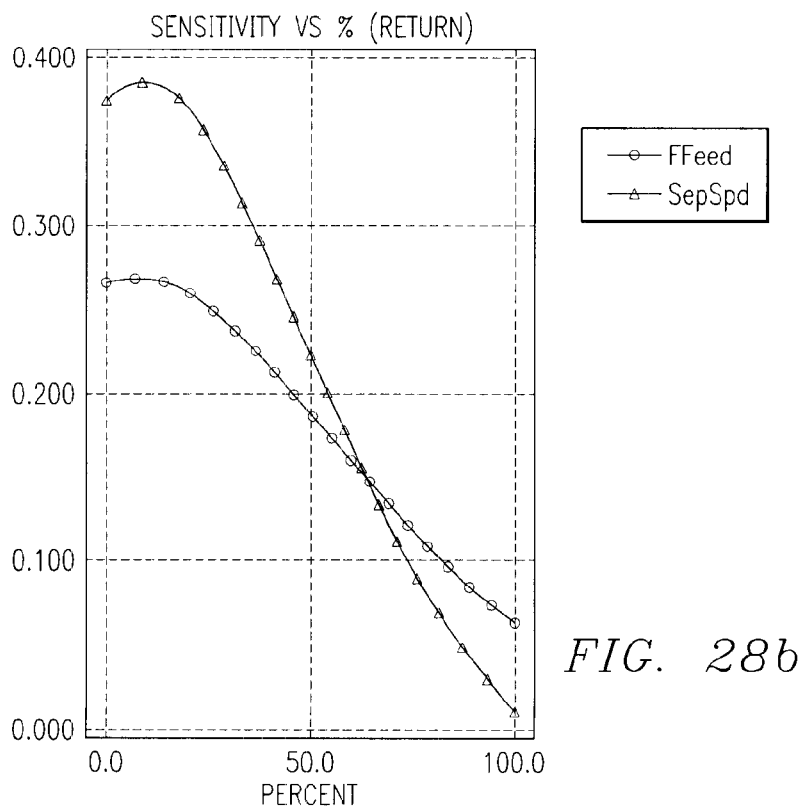

Referring now to FIGS. 28a and 28b, there are illustrated plots of process gains for the overall non-linear mill model with the scales altered. In FIG. 28a, there is illustrated a plot of the sensitivity versus the percent move of the Blaine. There are provided two plots, one for separator speed and one for fresh feed. The upper plot illustrates that the sensitivity of Blaine to separator speed is very low, whereas the gain of the percent movement of fresh feed with respect to the Blaine varies considerably. It can be seen that at a minimum, the gain is approximately −1.0 and then approaches 0.0 as Blaine increases. In the plot of FIG. 28b, there is illustrated two plots for the sensitivity versus the percent return. In the upper plot, that associated with the percent movement of separator speed, it can be seen that the gain varies from a maximum of 0.4 at a low return to a gain of 0.0 at a high return value. The fresh feed varies similarly, with less range. In general, the plots of FIGS. 28a and 28a, it can be seen that the sensitivity of the control variable, e.g., Blaine in FIG. 28a and return in the plot of FIG. 28b, as compared to the manipulated variables of separator speed and fresh feed. The manipulated variables are illustrated as ranging from their minimum to maximum values.

In operation of the controller 2520, the process gains (sensitivities) are calculated from the neural network model (steady state model) at each control execution, and downloaded into the predictive models in the linear controller (dynamic model). This essentially provides the linear controller with the dynamic gains that follow the sensitivities exhibited by the steady-state behavior of the process, and thereby provides non-linear mill control utilizing a linear controller. With such a technique, the system can now operate over a much broader specification without changing the tuning parameters or the predictive models in the controller.

Figure 29:
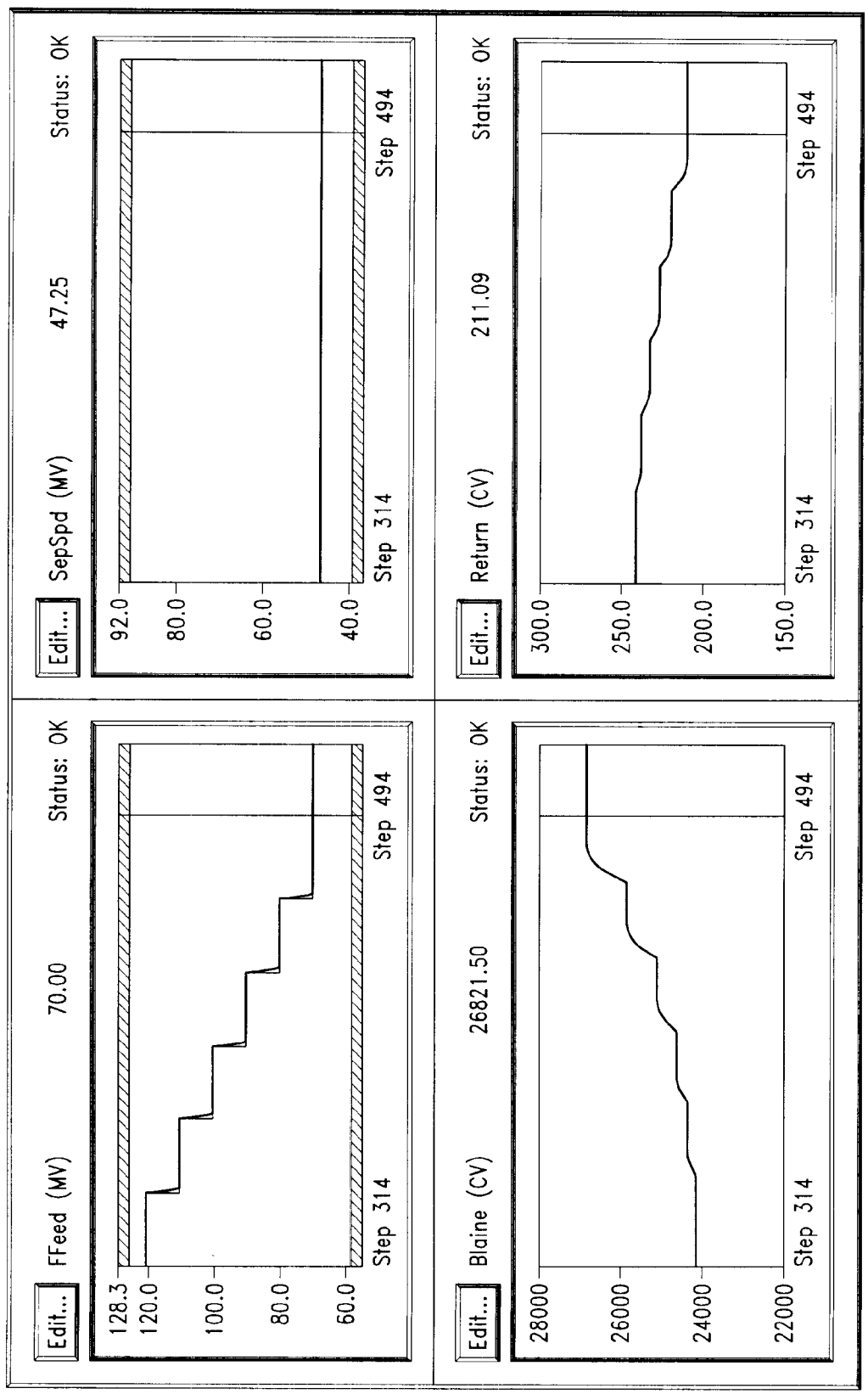
FIG. 29 illustrates non-linear gains for fresh feed responses.

Referring now to FIG. 29, there is illustrated a plot of non-linear gains for fresh feed responses for both manipulatible variables and control variables. The manipulatible variable for the fresh feed is stepped from a value of 120.0 to approximately 70.0. It can be seen that the corresponding Blaine output and the return output, the controlled variables, also steps accordingly. However, it can be seen that a step size of 10.0 in the fresh feed input does not result in identical step in either the Blaine or the return over the subsequent steps. Therefore, it can be seen that this is clearly a non-linear system with varying gains.

Figure 30:
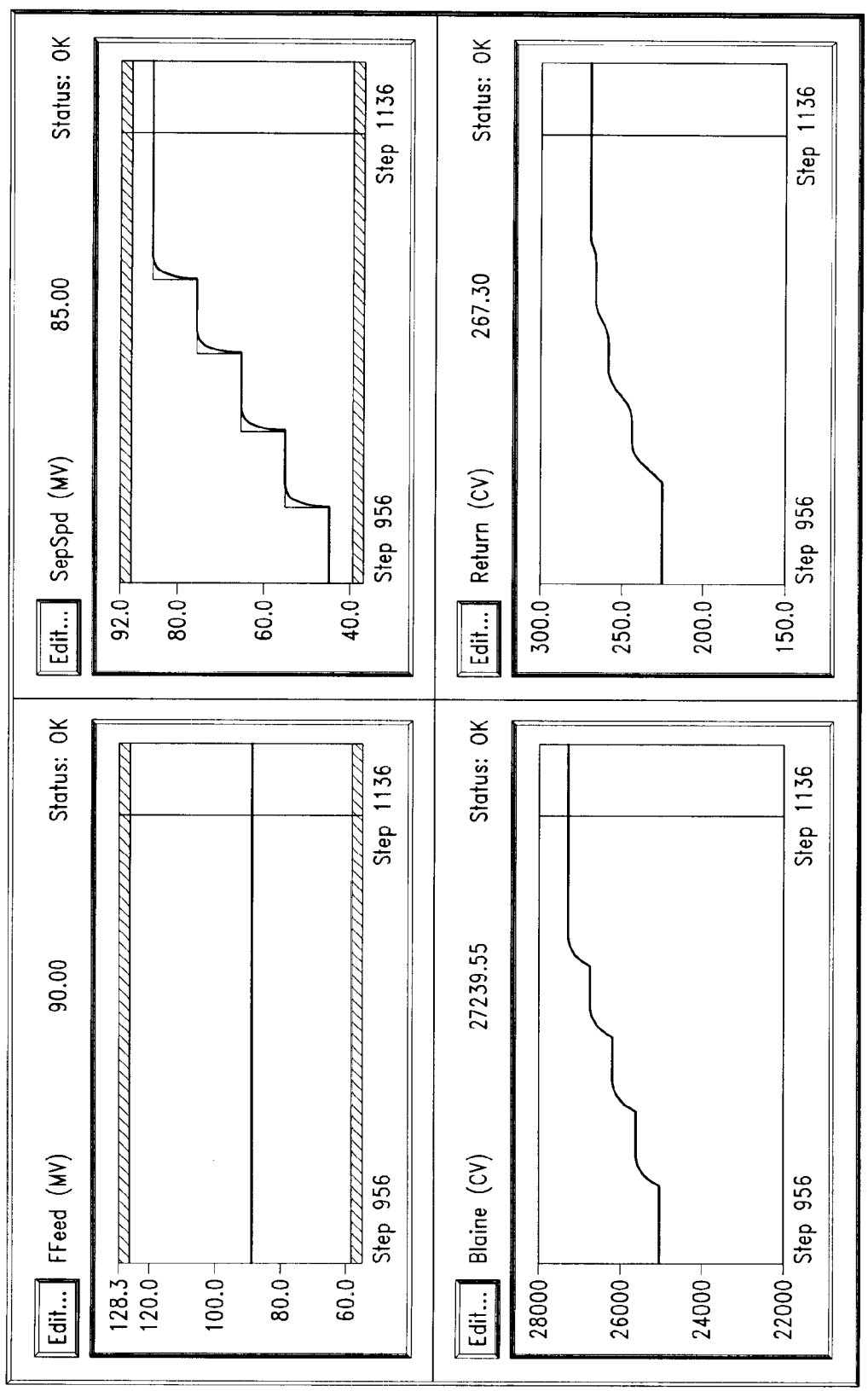
FIG. 30 illustrates plots of non-linear gains for separator speed responses.

Referring now to FIG. 30, there is illustrated four plots of the non-linear gains for separator speed responses, wherein the separator speed as a manipulatible variable is stepped from a value of approximately 45.0 to 85.0, in steps of approximately 10.0. It can be seen that the return controlled variable makes an initial change with an initial step that is fairly large compared to any change at the end. The Blaine, by comparison, appears to change an identical amount each time. However, it can be seen that the response of the return with respect to changes in the separator speed will result in a very non-linear system.

Figure 31:
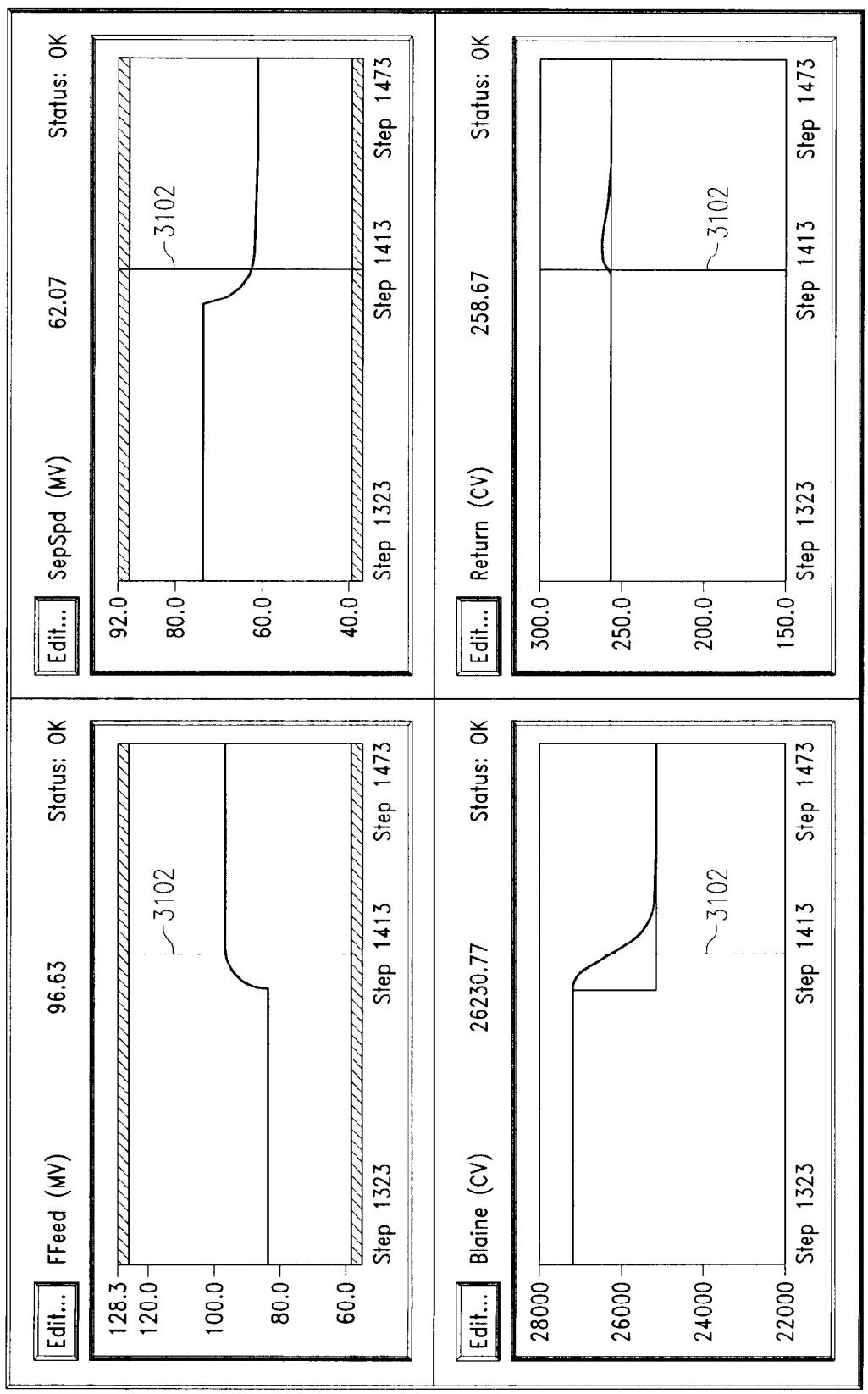
FIG. 31 illustrates a closed loop non-linear model predictive control, target change for Blaine.

Referring now to FIG. 31, there is illustrated an overall output for the closed loop control operation wherein a target change for the Blaine is provided. In this system, it can be seen that the fresh feed is stepped at a time 3102 with a defined trajectory and this results in the Blaine falling and the return rising and falling. Further, the separator speed is also changed from one value to a lower value. However, the manipulatible variables have the trajectory thereof defined by the non-linear controller such that there is an initial point and a final point and a trajectory therebetween. By correctly defining this trajectory between the initial point and the final point, the trajectory of the Blaine and the return can be predicted. This is due to the fact that the non-linear model models the dynamics of the plant, these dynamics being learned from the step tests on the plant. This, of course, is learned at one location in the input space and, by utilizing the steady state gains from the non-linear steady state model to manipulate the dynamic gains of the linear model, control can be effected over different areas of the input space, even though the operation is non-linear from one point in the input space to another space.

Figure 32:
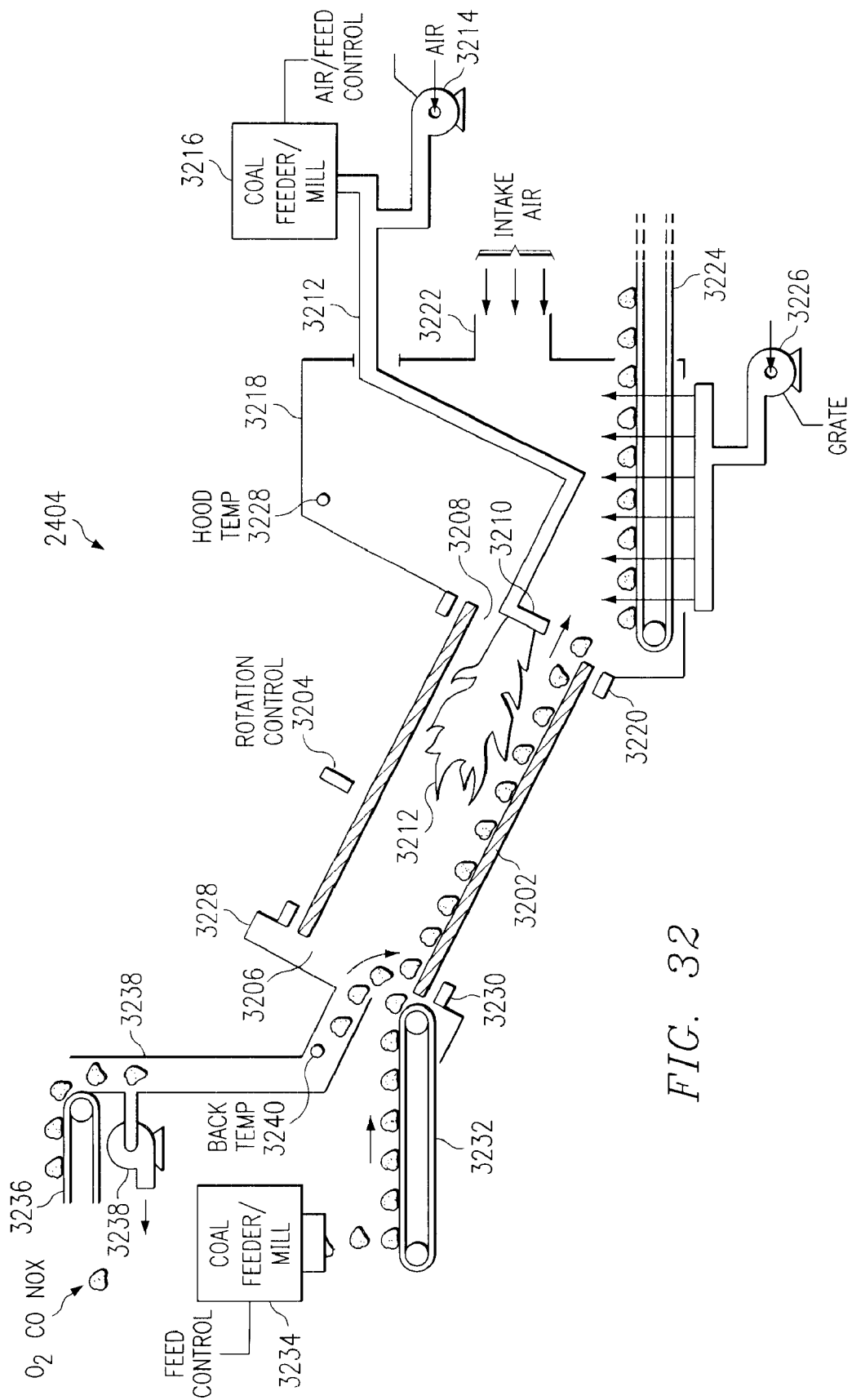
FIG. 32 illustrates a detailed block diagram of kiln.

Referring now to FIG. 32, there is illustrated a more detailed schematic of the kiln 2404. The kiln is basically a cylindrical apparatus 3202 which is operable to rotate under control of a rotation motor 3204 which has a rotation control input connected thereto. This cylinder is approximately 12 feet in diameter and is disposed at an angle thereto to allow material to be fed into a back end 3206, which is at a higher inclination, and exit at a front end 3208 at a lower inclination. The front end 3208 has a burner 3210 disposed therein for generating a flame 3212. The burner 3210 is fed by a coal supply through a tube 3212 which has a blower 3214 connected thereto for forcing air therethrough. This air is mixed with coal from a coal feeder/mill 3216. This basically constitutes the fuel or coal that is fed to the front end or the "Front End Coal." The coal feeder 3216 basically feeds coal in at a defined rate in accordance with an air/feed control mechanism to force the ground up coal into the burner 3210 to feed the flame 3212. This is a control that will be described hereinbelow.

The cylinder 3202 has disposed on the front end thereof a hood 3218. This hood 3218 is interfaced with the front end 3208 of the cylinder 3202 with a seal 3220. This allows the cylinder 3202 to rotate at a defined speed, which defined speed is set by the operator. As will be described hereinbelow, as the speed is increased, the feed rate of material into the back end 3206 is increased to increase the throughput. In the hood 3218, there is provided an air inlet 3222, which provides for intake air which is the result of an induction (ID) fan at the back end 3206 of the cylinder 3202, which will be described hereinbelow. As air is pulled in through the intake 3222, it will flow through the cylinder 3202.

As the cylinder 3202 rotates, material will exit the front end 3208 and will fall upon a moving exit mechanism 3224 referred to as a grate. This will remove the "clinker" from the cylinder 3202, cool it and take it out of the hood 3218. There is provided a grate cooler fan 3226 which is operable to force air through a grate in the mechanism 3224 to "cool" the clinker as it comes out of the hood 3218. This is a manipulatible variable (MV) in the system such that the amount of air disposed therethrough can be controlled, this providing a mechanism for controlling the overall quality of the output. The hood 3218 also has a temperature sensor 3228 associated therewith for maintaining the hood temperature. This hood temperature constitutes an important measurement wherein the "Hinge Point" is defined at the point in the process flow wherein the hottest portion of the process exists.

At the back end 3406 of the kiln 2404, there is provided a sealing hood 3228 which has a seal 3230 associated therewith to allow the air to be maintained within the hood 3228, while allowing the cylinder 3202 to rotate. In the back end 3206, there is associated therewith a coal delivery system 3232 which delivers the coal to the back end 3206 of the cylinder 3202. There is provided a coal feeder/mill 3234 which basically grinds coal in a controlled manner through an input for back end feed control. This basically provides pulverized coal onto the feed mechanism 3202 for delivery into the back end 3206 of the cylinder 3202 during operation thereof. As will be described hereinbelow, there is a ratio defined between the back end feed control and the front end feed control such that there can be provided a feed profile. This is the tilt with one end having a higher feed rate than the other.

The raw meal (powder) is provided on a feed mechanism 3236 which enters into a preheater 3238. This raw meal, in one embodiment lava, is fed at a predetermined feed rate and an Induced Draft (ID) fan 3238 is provided for removing air from the preheater 3238 such that air is pulled in through the intake 3222 at the front end, drawn through the cylinder 3202 and up through the preheater 3238 and out through the fan 3238. This preheater 3238 is a cyclonic device that allows the "powder" to fall through the preheater 3238 and into the back end of the cylinder 3202. The preheater 3238 has disposed therein proximate to the hood 3238 a back temperature sensor 3240 to provide a temperature measurement at the back end 3206 in the form of a temperature sensed value "Back Temp." Additionally, there are provided $O_2$, CO, and NOx sensors for sensing the respective levels of these components in the effluent air.

During control, as described hereinabove, there is provided a level of control that can control the total coal that is fed to the system, maintain the ratio of the back coal and the front coal to each other, maintain the $O_2$ and CO levels at an appropriate level and the hinge point for the hood temperature at a defined point. This is a linear predictive controller that provides a prediction of a "move" that is required in order to compensate for an external disturbance. The external disturbance will typically be a change in the speed of the cylinder 3202. This is defined by the operator. Typically, there is defined a feed rate for the system whenever the rotation of the cylinder is changed by the operator. Thus, the operator will change the rotation speed, which will automatically change the amount of feed that is input to the system, which will change the output. The dynamics of the system must be accounted for by changing the total coal, maintaining the Hinge Point and maintaining the $O_2$ and CO levels at a predefined target, all of this being maintained with respect to a predefined percent coal to the back. As will be described hereinbelow, this percent coal to the back is a value that is defined by lab tests of the free lime levels.

Figures 33, 36:
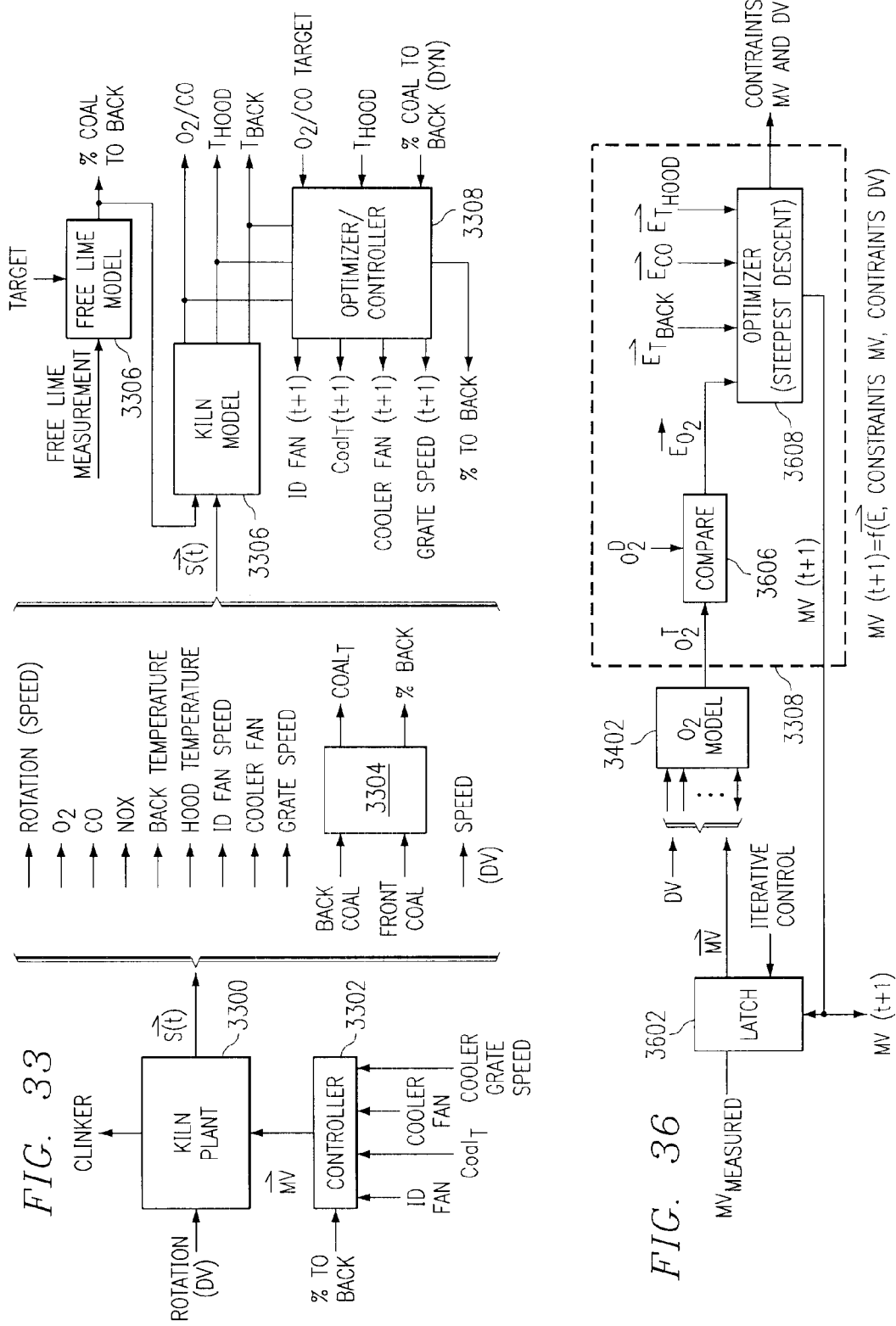
FIG. 33 illustrates a detailed block diagram of the MPC controller.
FIG. 36 illustrates the optimization function.

Referring now to FIG. 33, there is illustrated a block diagram of the overall MPC as it applies to the overall kiln. In the illustration of FIG. 33, there is provided a general a block 3300 representing the kiln plant. This is the actual plant which receives a number of inputs to provide as a single output the clinker. This is the actual output of the plant. The inputs of the plant are the plurality of manipulatible variables (MV) represented by a vector MV, in addition to various non-manipulatible inputs referred to as "Disturbance Variables (DV)" which are represented by a vector DV. The primary disturbance variable in this plant is the rotation speed. As mentioned hereinabove, the rotation speed can be changed by the operator, and when changed, also changes the feed rate which also constitutes a disturbance variable since this is not manipulatible.

A controller 3302 is operable to generate the MV. Inputs to the controller are the ID fan, the total coal, the cooler fan speed and the cooler grate speed, in addition to the percent coal to the back of the kiln. There are also a plurality of measurable variables, these being the state variables represented as a vector s(t). These are such things as the rotation (speed), $O_2$, CO, $NO_x$, the back temperature of the kiln, the hood temperature of the kiln, the ID fan speed, the cooler fan speed and the grate speed. In addition, there is also provided as an output the back coal feed value and the front coal feed value. However, these are processed through a process block 3304 to represent the outputs as the total coal and the percent coal to the back, as these are the inputs that are dealt with by the model. These two outputs, in addition to the previous outputs representing the s(t) represented input to a kiln model 3306. As will be described hereinbelow, this kiln model comprises a plurality of linear dynamic models with different dynamic responses that are operated in conjunction with each other.

In addition to the sensed values s(t), there is also provided a separate input that is a function of the free lime measurement. This free lime measurement is a lab measurement wherein the actual output—the clinker, will be evaluated to determined the percent free lime therein. This percent free lime measurement is input to a free lime model 3306 which is operable to receive a target value of free lime, which in the disclosed embodiment is 1.4%. The prediction is then made as to what the percent coal to the back needs to be in order to achieve the target free lime value. This is a dynamic output and represents the path to achieve such value. This is provided as an input to the kiln model 3306. This, in and of itself, is a linear model that operates in a separate and outside loop to the control model that is disposed within the kiln model, as will be described hereinbelow.

The output of the kiln model 3306 represents a number of predicted values, the $O_2$/CO, the hood temperature and the back temperature. These are predicted values and these values represent the predicted dynamics of these values. These are input to an optimizer/control block 3308 which is operable to optimize the path for these dynamic values in response to various inputs as targets. These are the $O_2$/CO target, the hood temperature target and the percent coal to the back target. The optimizer controller 3308 will output values for input to the controller 3302. Each of these outputs comprises a manipulatible variable (MV) in the future. Therefore, this is referred to as an MV(t+1) value. This is an iterative process wherein the optimizer/controller 3308 will generate a value, input it back to the kiln model, calculate a new error value and continue until the error is reduced, as will be described hereinbelow. This therefore represents a complete feedback loop and control operation for the system.

Figure 34:
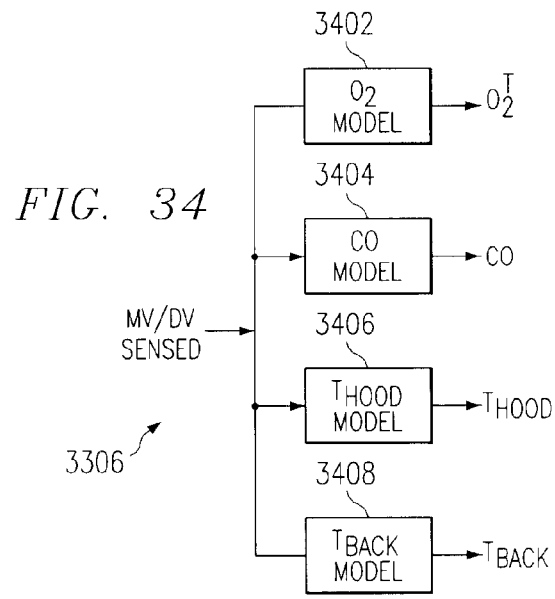
FIG. 34 illustrates a block diagram of the separate dynamic models for the kiln model.

Referring now to FIG. 34, there is illustrated a simplified diagrammatic view of the kiln model 3306. The sensed values s(t) are in general comprised of the sensed MVs and also the sensed DVs. These MV/DV sensed values are input to, in the disclosed embodiment, four separate dynamic models. The first is a model 3402 representing the $O_2$ model, which is operable to predict a dynamic response of $O_2$. A second model, a model 3404 represents the dynamic model of the CO, which is a prediction of the dynamic response of the CO. The third model, a model 3406, represents the dynamic response of the hood temperature, this provided as an output. A fourth model, a model 3408 represents a model of the temperature at the back of the kiln. Each of these models is a multi-variable input model that potentially receives all MVs and DVs. The models 3402–3408 will predict the dynamic response of the various outputs, it being noted that the dynamic responses will be different, i.e., some are fast and some are slow.

Figure 35:
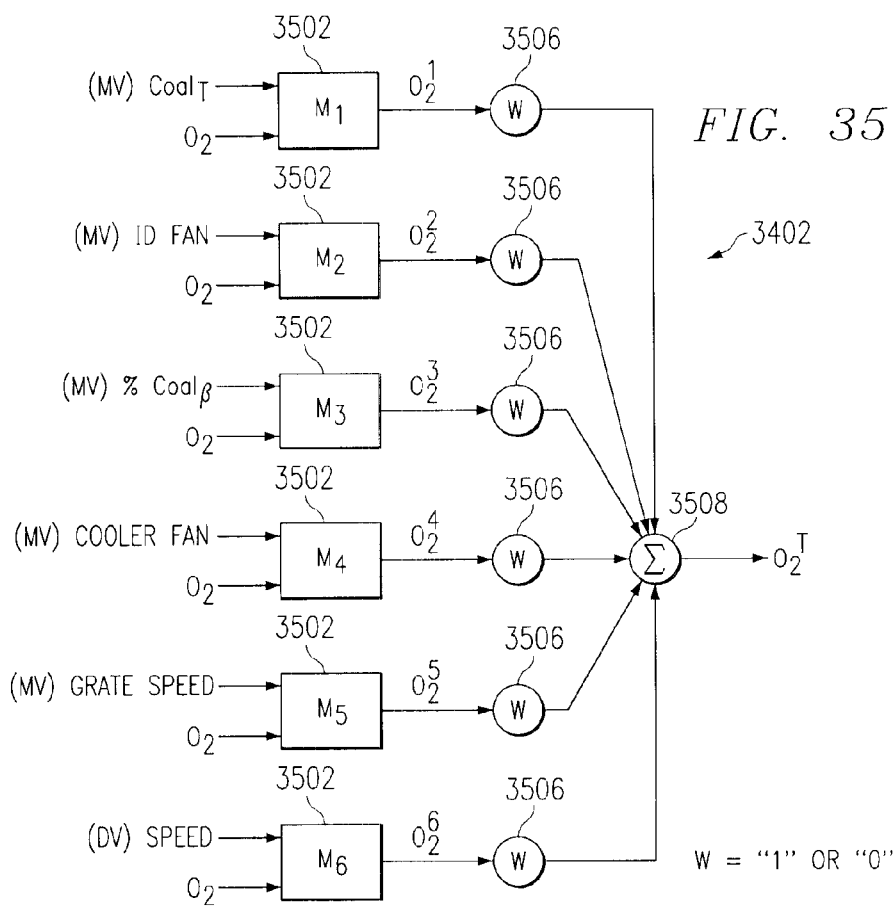
FIG. 35 illustrates a detailed diagram of each of the separate dynamic models.

Referring now to FIG. 35, there is illustrated a more detailed block diagram of a single one of the models, the example illustrating that of the model 3402 for $O_2$. However, each of the models 3402–3408 will be represented by a similar block diagram as that of FIG. 35. In the block diagram of FIG. 35, there is provided a separate dynamic model for each of the MVs and DVs. These are models 3502, there being six of these models for the disclosed MV/DVs. They are labeled $M_1, M_2, \ldots, M_6$ for six separate models 3502. Each of the models predicts the dynamic response of $O_2$ as a function of the starting value, i.e., the present value of $O_2$, and the present value of the associated MV or DV. For example, the model $M_1$ is associated with the total coal, $Coal_T$. This model 3502, labeled $M_1$, will predict what the dynamic response of $O_2$ will be for the measured value of $Coal_T$. Therefore, if there is a move in the input MV, then there will be a predicted dynamic response associated on the output thereof for $O_2$. There will therefore be six predicted values output by the six models, each of the models $M_1, M_2, \ldots, M_6$ being separate outputs. Each of the linear dynamic models, as described hereinabove, constitutes a linear algorithm with a set of coefficients which define the gain of the linear model and response of the linear model.

Each of the outputs of each of the models 3502 is input to a weighting block 3506. This weighting block 3506 is, in the disclosed embodiment, either a "1" or a "0," representing selection of the model 3502 for output from the weighting block 3506 or deletion of the output thereof from the output. However, this could be an analog weighting value between "1" and "0." The outputs of the weighting blocks 3506 are summed in a summing block 3508 to provide a total $O_2$ dynamic response. The reason for deleting select ones of the model 3502 outputs is that there occurs a "smearing" of the dynamics of the output due to the fact that the response of the output is different for different MVs/DVs. For example, the response of $O_2$ associated with a change in fan speed, such as the ID fan, is fast, whereas the response of $O_2$ to the total coal input is very slow. To prevent the smearing, the response of $O_2$ is recognized as being very fast and, therefore, all or some slow response models will be deleted. In the disclosed embodiment, the only model retained in this dynamic model is the model $M_2$ associated with ID fan speed. This is also the case with the CO model. The following table illustrates the MVs/DVs that are selected for each of the models 3402–3408.

TABLE 1

|  | $O_2$ | CO | $T_{HOOD}$ | $T_{BACK}$ |
|---|---|---|---|---|
| (MV) $Coal_T$ |  |  | X | X |
| (MV) ID Fan | X | X |  |  |
| (MV) Cooler Fan |  |  | X | X |
| (MV) Grate Speed |  |  | X | X |
| (MV) % Back |  |  | X | X |
| (CV) Speed |  |  | X | X |

Referring now to FIG. 36, there is illustrated a block diagram for the optimizing operation. Each of the outputs of each of the models 3402–3408 are input to the optimizer 3308. This is an iterative process which requires each of the measured MVs (the s(t) values) must be input to a latch 3602 which is operable to latch the input values and, in a first and initial iteration step, input them to the various models 3402–3408, there only being represented one of the models 3402 in the block diagram of FIG. 36. Each of the models 3402 generates the respective total output, which is the sum of the individual dynamic models, to a compare circuit 3606. This is operable to compare the predicted value for the dynamic response to the desired value, i.e., the target. This generates an error value for the associated model output, in this example, $O_2$. This will be an error value $E_{O2}$. Each of the models 3404–3408 will also provide error outputs from an associated compare block 3606 as errors $E_{CO}$, $E_{THOOD}$ and $E_{TBACK}$. These are input to an optimizer 3608 that is operable to utilize a steepest descent method for optimizing the values based upon certain constraints associated with each of the MVs. The optimizer 3608 generates a future value MV(t+1) for each of the MVs in accordance with the steepest descent algorithm. This is a function of these errors, E, the MV constraints and the DV constraints. Therefore, each of the values are optimized within certain constraints such that the overall optimized operation of the system will be determined in view of these constraints. However, it is noted that each of the models 3402–3408 have a different dynamic response. For example, the dynamic response of the $O_2$ and CO models 3202 and 3404, respectively, are three times as fast as the dynamic response of the hood temperature model 3406, which is approximately three times as fast as the back temperature model 3408. The particular models that contribute to the dynamic responses in each of the models 3402–3408 are selected with the weighting values on the weighting blocks 3506 to determine these responses, i.e., the slow responses are typically deleted for the fast response $O_2$ and CO models and all or select ones of the fast response models 3502 are deleted for the slower response $T_{HOOD}$ and $T_{BACK}$ 3406 and 3408. It is a solution of this multi variable problem utilizing separate dynamic response inputs to the optimizer with the prediction of the "path" that is predicted for a particular MV in response to a move on an MV. For example, if the rotational speed is changed, this will result in a prediction of the hood temperature changing. Since this constitutes the "hinge" point for the operation, the optimizer 3308 will predict the necessary change to move the Hood Temp back to the Hinge Point and provide it as an output from the optimizer 3608. This will be input to the latch 3602 for an iterative procedure which will be cycled through the kiln model 3306 to generate new errors until the errors are within acceptable limits. Once this iteration is complete, the output vector MV(t+1) will be input to the controller 3302, this being in the form of a dynamic prediction over a number of time increments, as described hereinabove. Therefore, it is the utilization of a plurality of separate and distinct dynamic models to predict a select number of sensed outputs in the system for the purpose of control, with the dynamic responses thereof being different and defined by the relationship of that predicted value to select ones of the MVs. As noted hereinabove, although the predicted value is a function of substantially all of the MVs to some extent, only the dynamic response with respect to certain of the MVs is considered.

Although the preferred embodiment has been described in detail, it should be understood that various changes, substitutions and alterations can be made therein without departing from the spirit and scope of the invention as defined by the appended claims.

What is claimed is:

1. A controller for controlling a multi-variable input plant having a plurality of manipulatible variables (MVs) as inputs, and operable to provide an output, comprising:

a predictive model of the dynamics of selected aspects of the operation of the plant for modeling the dynamics thereof, said model having at least two discrete models associated therewith that model at least two of the selected aspects, said at least two discrete models having different dynamic responses and each of said discrete models providing a predicted output of said respective selected aspect;

an optimizer for receiving desired values for the selected aspects of the operation of the plant modeled by said predictive model and said predicted outputs from said predictive model and optimizing the inputs to said predictive model to minimize error between the predicted and desired values; and a control input device for applying the optimized input values to the plant after optimization thereof.

2. The controller of claim 1, wherein said at least two discrete models are linear dynamic models.

3. The controller of claim 1, wherein said at least two discrete models are independent of each other.

4. The controller of claim 1, wherein said at least two discrete models are separate and independent models.

5. The controller of claim 1, wherein said optimizer is further operable to receive constraints on said input values such that the optimization operation changes the inputs within said constraints when minimizing the error between the predicted and desired values.

6. The controller of claim 1, wherein the plant is subject to at least one disturbance variable that alters the operation of the plant and wherein said predictive model will predict the behavior of the selected aspects modeled thereby in response to changes in the at least one disturbance variable and said optimizer will change the inputs to again minimize the error between the predicted and desired values.

7. The controller of claim 1, wherein said two discrete models are linear dynamic models and wherein each said at least two discrete models each comprise:

a plurality of independent sub models, each associated with one of the inputs to the associated model, each of said independent sub models operable to model the associated select aspect as a function of the associated input thereto; and a summing device for summing the output of said independent sub models for each of said discrete models to provide a single output associated with each of said discrete models that is a function of all of the inputs that are input to each of said associated sub models for each of said discrete models.

8. The controller of claim 7, wherein said optimizer comprises:

a comparator for comparing for each of said discrete models the associated desired value with the predicted output of said discrete model to generate an error value as the difference therebetween for each of said discrete models; and an iterative optimization device for incrementally changing the MV inputs over a defined dynamic path for all of said discrete models and inputting them to said model over a plurality of iterative cycles to minimize the error between the desired values and the predicted values.

9. The controller of claim 8, wherein said iterative controller optimization device is operable to utilize a steepest descent optimization algorithm for the optimization procedure.

10. The controller of claim 1, wherein the dynamic responses of said at least two models differ by a factor of three.

11. The controller of claim 1, wherein there are provided at least three models for modeling three of the selected aspects, they being different aspects and having different dynamic responses.

12. The controller of claim 11, wherein the dynamic responses of said three models differ such that said first model is slower than second model and said second model is slower than said third model in dynamic responses associated therewith.

13. A method for controlling a multi-variable input plant having a plurality of manipulatible variables (MVs) as inputs, and operable to provide an output, comprising the steps of:

providing a predictive model of the dynamics of selected aspects of the operation of the plant for modeling the dynamics thereof, the model having at least two discrete models associated therewith that model at least two of the selected aspects, the at least two discrete models having different dynamic responses and each of the discrete models providing a predicted output of the respective selected aspect;

receiving in an optimizer desired values for the selected aspects of the operation of the plant modeled by the predictive model and the predicted outputs from the predictive model and optimizing the inputs to the model to minimize error between the predicted and desired values; and applying the optimized input values to the plant after optimization thereof.

14. The method of claim 13, wherein the at least two discrete models are linear dynamic models.

15. The method of claim 13, wherein the at least two discrete models are independent of each other.

16. The method of claim 13, wherein the at least two discrete models are separate and independent models.

17. The method of claim 13, wherein the step of optimizing is further operable to receive constraints on the input values such that the optimization operation changes the inputs within the constraints when minimizing the error between the predicted and desired values.

18. The method of claim 13, wherein the plant is subject to at least one disturbance variable that alters the operation of the plant and wherein the predictive model will predict the behavior of the selected aspects modeled thereby in response to changes in the at least one disturbance variable and the step of optimizing will change the inputs to again minimize the error between the predicted and desired values.

19. The method of claim 13, wherein the two discrete models are linear dynamic models and wherein each the step of providing the at least two discrete models comprises:

providing a plurality of independent sub models, each associated with one of the inputs to the associated model, each of the independent sub models operable to model the associated select aspect as a function of the associated input thereto; and summing the output of the independent sub models for each of the discrete models to provide a single output associated with each of the discrete models that is a function of all of the inputs that are input to each of the associated sub models for each of the discrete models.

20. The method of claim 19, wherein the step of optimizing comprises the steps of:

comparing with a comparator for each of the discrete models the associated desired value with the predicted output of the discrete model to generate an error value as the difference therebetween for each of the discrete models; and incrementally changing with an iterative optimization device the MV inputs over a defined dynamic path for all of the discrete models and inputting them to the model over a plurality of iterative cycles to minimize the error between the desired values and the predicted values.

21. The method of claim 20, wherein the step of incrementally changing is operable to utilize a steepest descent optimization algorithm for the optimization procedure.

22. The method of claim 13, wherein the dynamic responses of the at least two models differ by a factor of three.

23. The method of claim 13, wherein there are provided at least three models for modeling three of the selected aspects, they being different aspects and having different dynamic responses.

24. The method of claim 23, wherein the dynamic responses of the three models differ such that the first model is slower than second model and the second model is slower than the third model in dynamic responses associated therewith.

* * * * *

UNITED STATES PATENT AND TRADEMARK OFFICE
Certificate

Patent No. 6,438,430 B1                                                          Patented: August 20, 2002

On petition requesting issuance of a certificate for correction of inventorship pursuant to 35 U.S.C. 256, it has been found that the above identified patent, through error and without any deceptive intent, improperly sets forth the inventorship.
    Accordingly, it is hereby certified that the correct inventorship of this patent is: Gregory D. Martin, Georgetown, TX (US); Eugene Boe, Austin. TX (US); Stephen Piche, Austin, TX (US); James David Keeler, Austin, TX (US); Doulas Timmer, McAllen, TX (US); Mark Gerules, Cedar Park, TX (US); John P. Havener, Plano, TX (US); and Steven J. McGarel, Austin, TX (US).

Signed and Sealed this Eighth Day of August 2006.

ANTHONY KNIGHT
*Supervisory Patent Examiner*
Art Unit 2121